United States Patent
Reolon et al.

(10) Patent No.: US 10,591,279 B2
(45) Date of Patent: Mar. 17, 2020

(54) INTEGRATED OPTICAL DEVICE FOR CONTACTLESS MEASUREMENT OF ALTITUDES AND THICKNESSES

(71) Applicant: ASENTYS SAS, Chateauneufle Rouge (FR)

(72) Inventors: David Reolon, Chateauneuf le Rouge (FR); David Marsaut, Chateauneuf le Rouge (FR)

(73) Assignee: ASENTYS SAS, Chateauneuf le Rouge (FR)

( * ) Notice: Subject to any disclaimer, the term of this patent is extended or adjusted under 35 U.S.C. 154(b) by 197 days.

(21) Appl. No.: 15/533,879

(22) PCT Filed: Dec. 9, 2014

(86) PCT No.: PCT/IB2014/066719
§ 371 (c)(1),
(2) Date: Oct. 10, 2017

(87) PCT Pub. No.: WO2016/092348
PCT Pub. Date: Jun. 16, 2016

(65) Prior Publication Data
US 2018/0038680 A1    Feb. 8, 2018

(51) Int. Cl.
*G01B 11/06* (2006.01)
*G02B 21/00* (2006.01)
(Continued)

(52) U.S. Cl.
CPC ...... *G01B 11/0625* (2013.01); *G01B 11/0608* (2013.01); *G01J 3/0208* (2013.01);
(Continued)

(58) Field of Classification Search
CPC ............................ G01B 11/0625
(Continued)

(56) References Cited

U.S. PATENT DOCUMENTS

2004/0051879 A1* 3/2004 Schick ............ G01B 11/026
356/601
2010/0099984 A1    4/2010 Graser
(Continued)

FOREIGN PATENT DOCUMENTS

DE    102007044530 A1    4/2009
FR       2716727 A1    9/1995
(Continued)

OTHER PUBLICATIONS

Kebin Shi, et al., "Surface profile measurement using chromatic confocal microscopy", Proceedings of SPIE, vol. 5606, 2004, pp. 124-131, XP002743774, DOI: 10.1117/12.571595.
(Continued)

*Primary Examiner* — Tarifur R Chowdhury
*Assistant Examiner* — Omar H Nixon
(74) *Attorney, Agent, or Firm* — Hauptman Ham, LLP

(57) ABSTRACT

An optical device for contactless measurement of height and/or thickness. The optical device having an axial chromatic aberration in order to encode the height and/or thickness information of an object positioned in the measurement field. The optical system is anchored in a confocal architecture. A detection system decodes the information through a detection system allowing the wavelength(s) focused on the surface(s) of the object to be discriminated. A plurality of points can be measured simultaneously or successively.

13 Claims, 13 Drawing Sheets

(51) Int. Cl.
*G01J 3/02* (2006.01)
*G01J 3/28* (2006.01)

(52) U.S. Cl.
CPC .......... *G01J 3/0218* (2013.01); *G01J 3/0264* (2013.01); *G01J 3/2823* (2013.01); *G02B 21/0032* (2013.01); *G02B 21/0064* (2013.01); *G01B 2210/50* (2013.01)

(58) Field of Classification Search
USPC ........................................................ 356/320
See application file for complete search history.

(56) References Cited

U.S. PATENT DOCUMENTS

| | | | |
|---|---|---|---|
| 2011/0001950 A1* | 1/2011 | DeVoe | G03F 7/2053 355/67 |
| 2011/0013186 A1* | 1/2011 | Miki | G01B 11/026 356/364 |
| 2012/0075425 A1 | 3/2012 | Thiel | |
| 2013/0135715 A1 | 5/2013 | Chen et al. | |
| 2015/0090908 A1* | 4/2015 | Lippert | G01B 11/0608 250/559.07 |
| 2015/0228069 A1* | 8/2015 | Fresquet | B24B 49/12 348/87 |

FOREIGN PATENT DOCUMENTS

| | | |
|---|---|---|
| FR | 2738343 A1 | 3/1997 |
| FR | 2824903 A1 | 11/2002 |
| FR | 2950441 A1 | 3/2011 |

OTHER PUBLICATIONS

International Search Report for corresponding International PCT Application No. PCT/IB2014/066719.

* cited by examiner

INTEGRATED OPTICAL DEVICE FOR CONTACTLESS MEASUREMENT OF ALTITUDES AND THICKNESSES

The present invention relates to a device for contactless optical measurement that is single-point, for which a single point of the object is measured, or multipoint, dedicated to the measurement of height(s) and/or thickness(es). This measurement device is based on the principle of chromatic confocal microscopy and thus has the properties related to the confocality of an optical system associated with a controlled axial chromatic aberration.

The confocal optical system requires having a single-point illumination system. The image of the source point is focused on the object to be measured, and the light reflected or backscattered by the object is in turn imaged onto a confocal diaphragm (spatial filter) positioned upstream of the photodetector. The source point, the object and the diaphragm are confocal. With respect to full-field microscopy, a confocal system allows the axial and lateral selectivity to be increased. The light coming from a plane located outside of the focal plane, as well as the light coming from a point outside of the optical axis, is filtered by the confocal diaphragm, thus improving the signal-to-noise ratio and the lateral resolution of the optical system.

The control of the axial chromatic aberration provides a confocal optical system with the chromatic dispersion of the spectrum of the source of light along its optical axis. This controlled optical aberration allows the encoding of the height or of the thickness according to the wavelength. The decoding of this information is carried out via a system capable of analysing the wavelengths of the spectrum backscattered by the object.

The combination of these two principles into a shared architecture allows the observation and measurement of a set of points of the space included in the measurement volume of the measurement apparatus without being disturbed by its neighbours. The measurement volume is defined by the illuminated lateral field (defined by the set of illuminated points), spread out along the optical axis and limited to within the axial chromatic aberration of the optical system. This type of measurement device allows very good performance to be obtained, in particular in terms of axial and lateral resolution.

In order to carry out their functions, these measurement apparatuses consist:
  Of a polychromatic source,
  Of an optical system having a controlled axial chromatic aberration,
  Of a spectral analysis system such as a spectrometer,
  Of means for processing the signal, calculation and data transmission.

The invention described by the reference patent [1], relates to a method and a measurement apparatus based on the principle of chromatic confocal microscopy, according to the prior art. The device mentioned, uses a polychromatic source, a holographic or diffractive lens such as a Fresnel lens in order to generate an axial chromatic aberration, and a spectral analysis device in order to determine the highest-energy wavelength corresponding to the wavelength perfectly focused on the object. This embodiment allows the position of an object with respect to a reference surface positioned upstream of the object to be measured. Said measurement apparatus is single-point. This patent is a reference for chromatic confocal measurement systems, and the apparatuses of measurements of the prior art all have at least one optical fibre associated with a coupler such as a beam splitter cube, or a fibre coupler, whether for the chromatic confocal measurement devices provided with a lateral field or for the particular case, much more widespread in the industry of three-dimensional measurement, of the single-point measurement apparatus, for which a single point of the object is measured. The referenced patents [2], [3] and [4] will now be examined.

The invention described by reference patent [2], relates to a chromatic confocal measurement apparatus provided with a lateral field according to the prior art.

FIG. 1 illustrates an embodiment of a chromatic confocal measurement apparatus provided with a lateral field according to the prior art [Cf. Reference 2], such that the lateral field represents a line. Other embodiments for this measurement apparatus exist in such a way as to obtain, for example, a field having a rectangular shape, but they are not shown here. FIG. 1 illustrates a chromatic confocal measurement device according to the prior art, consisting of an optoelectronic box 100, of a measurement head 200, connected by an optical cable 300.

The optoelectronic box 100 consists of a polychromatic source 10, a spectral analysis device 20, computer and electronic means 30 for processing the signal, calculation, data transmission, control and configuring the measurement apparatus, and a power supply block 40. This chromatic confocal measurement apparatus provided with a lateral field allows an object 400 having a surface to be measured positioned in its measurement volume 500 to be measured.

The measurement head 200 consists of a set of optical lenses 50 provided with a controlled axial chromatic aberration. This set of optical lenses 50 can be separated into two subsets: a collimator 51 and a chromatic lens 52. The collimator 51 is thus totally devoid of an axial chromatic aberration, and its role is to collimate the beam coming from the ends 73 of the optical cable 300 and to manage the magnification of the set of optical lenses 50 and thus manage the size of the spot on the object 400. The chromatic lens 52 is a set of lenses allowing the desired chromatic aberration to be obtained. This chromatic aberration can also be generated by using diffractive lens such as a Fresnel lens [Cf. Reference 1 and 4]. The measurement head 200 also contains a beam splitter parallelepiped 60, the role of which is to direct the beams coming from the ends 73 of the optical cable 300 towards the set of optical lenses 50 up to the object 400 and to direct the beams backscattered by the object 400 and coming from the set of optical lenses 50 towards the ends 74 of the optical cable 300. This combination/separation assembly is shown in FIG. 1, by a beam splitter parallelepiped 60 but can also be the coupling zone of a set of fibre couplers.

In the case in which, the combination/separation assembly is a beam splitter parallelepiped 60, the optical cable 300 consists of N fibres 70 (N being an even positive integer) divided into N/2 illumination fibres 71, the role of which is to guide the light coming from the polychromatic source 10 towards the measurement head 200, and N/2 return fibres 72 allowing the light coming from the measurement head 200 to be guided towards the spectral analysis device 20. The ends 73 and 74, respectively, of the fibres 71 and 72 near the measurement head 200 are optically conjugated with the surface of the object 400. The ends 75 and 76, respectively, of the fibres 71 and 72 near the optoelectronic box 100 are positioned, respectively, facing the polychromatic source 10 and at the input of the spectral analysis device 20.

The principle of a chromatic confocal measurement apparatus provided with a lateral field is the following: The polychromatic source 10 emits radiation guided by a set of N/2 illumination fibres 71, up to a measurement head 200. The N/2 ends 73 of the illumination fibres 71 are spatially organised in such a way as to define a lateral measurement field (a line, a disc, or a rectangle for example). The light rays emitted by each of the N/2 illumination fibres 71 are propagated into the measurement head 200 provided with lateral fields and with an axial chromatic aberration. The wavelengths belonging to the spectrum of the polychromatic source 10 are thus dispersed along the optical axis. A continuum of wavelengths is generated for each point of the field, thus generating a measurement volume 500 in the space of the object 400. For each point of the field one wavelength is perfectly focused on the object 400, with the condition that the surface area to be measured of the object 400 is less than the measurement volume 500. Each wavelength perfectly focused for each point of the lateral field is backscattered by the objet 400. The backscattered light is propagated in the opposite direction in the measurement head and then through a combination/separation assembly 60 and is focused on the N/2 ends 74 of the N/2 return fibres 72. The N/2 ends 74 are conjugated with the N/2 ends 73, and consequently the ends 73 and 74 have exactly the same spatial organisation (line, disc, rectangle or others). The N/2 return fibres 72 guide each wavelength, perfectly focused on the object 400 for each point of the lateral field, towards the input of a spectral analysis device 20. The spectral analysis device 20—a grating spectrometer, for example—is provided with a photodetector 21 that allows the N/2 spectra corresponding to the N/2 measurement points forming the lateral field to be visualised. Each spectrum shows a peak of intensity corresponding to the wavelength perfectly focused on the object 400 for each point of the field. The computer and electronic means 30 allow each of the spectra to be processed, the position of the N/2 peaks to be determined, the N/2 equivalent heights to be calculated and its data to be simultaneously transmitted through a data transmission cable 32 to a computer 600. The measurement of N/2 heights distributed in the lateral field is thus carried out simultaneously.

In another embodiment described by reference patent [2], it is also possible to position a scanning mirror in the measurement head 200 between the collimator 51 and the chromatic lens 52 in order to successively measure a set of points.

The invention described by reference patent [3], relates to a line chromatic confocal measurement apparatus according to the prior art.

Other embodiments exist for this type of chromatic confocal measurement device provided with a lateral field [Cf. Reference 3]. The embodiment described in patent [3] is similar to the previous one, it specifies that it is also possible to introduce a matrix of micro-mirrors or a matrix of liquid crystals that can be sequentially switched via electronic means for periodic modulation. This matrix positioned either between the illumination cable 71 and the measurement head 200 or between the polychromatic source 10 and the illumination cable 71 allows the points belonging to the lateral field to be illuminated sequentially. The contribution of this patent with respect to the previous one [Cf. Reference 2] is in the possibility of successively illuminating the neighbouring points of the same line, which is not possible in the context of reference patent [2].

The patent application [Cf. Reference 4] relates to a single-point chromatic confocal measurement device allowing movements of the surface of an object 400 placed in the measurement volume 500 to be measured. The device described by said patent application uses a polychromatic source 10 and more particularly a white LED, a diffractive lens 52 that introduces a chromatic aberration in the direction of its optical axis, a lens called "objective", equivalent to the collimator 51 described in reference [2], which is positioned closer to the object 400 than the diffractive lens 52. The role of the "objective" lens 51, by positioning it between the object 400 and the diffractive lens 52, is to preserve the precision of the measurement apparatus regardless of the axial position of the surface of the object 400 in the measurement volume 500 of the apparatus. The author of said patent application, compares the response of the spectral analysis device 20 according to the position of the lens called "objective" 51. It appears that this response remains constant when the objective lens 51 is positioned between the diffractive lens 52 and the object 400, giving the system the property of having a constant precision over its entire range of measurement. On the contrary, when the "objective" lens 51 is positioned upstream of the diffractive lens 52, the response of the spectral analysis device 20, varies according to the axial position of the object 400 inside the measurement volume 500, which is a property known to a Person Skilled in the Art. However, the global response of the measurement system also depends on the response of the spectral analysis device 20, and depends, de facto, on its intrinsic configuration. Thus, for example, the response of a grating spectrometer is much different than that of a prism spectrometer since the formula of the prisms giving the angular dispersion according to the wavelength is much different than the formula of the gratings. A Person Skilled in the Art, must thus mention this effect, which causes the variation in the global response of the apparatus, and a fortiori in the precision of the apparatus in its range of measurement, according to the architecture of the spectrometer 20 used, regardless of the position of the lens called "objective" 51. Besides the claim related to the use and the positioning of the lens called "objective" 51, this patent application, reference [4], describes a system using a fibre optic coupler. The fibre optic coupler replaces the illumination fibre 71 associated with an element 60 for combination/separation of beams and with a return fibre 72. This fibre coupler thus allows, the luminous flux to be guided, between an optoelectronic box 100 consisting of a white LED source 10, a spectral analysis device 20, and a control unit equivalent to the computer and electronic means 30 for processing the signal, calculation, data transmission, control and configuring the measurement apparatus described in reference [2], and a measurement head 200 consisting in particular of the lenses called lens 51 and diffractive lens 52.

This fibre architecture, systematically used by the companies that design and/or manufacture these chromatic confocal measurement apparatuses, is also described in said patent application as providing flexibility in order to facilitate the movement of the measurement head 200 with respect to the controller 100. Moreover, it is also mentioned that the use of a fibre coupler allows the need to use spatial filters to be eliminated, the latter being embodied by the end of the illumination fibre of the fibre coupler. A Person Skilled in the Art is aware of the advantages provided by the use of the fibres 70, whether in terms of flexibility but also in terms of ease of production, yet the chromatic confocal measurement device according to the present invention also allows the constraints related to the use of these optical fibres to be totally or partly eliminated while preserving the flexibility of the architecture according to the prior art.

The two embodiments of a chromatic confocal measurement device provided with a lateral field according to the prior art [Cf. References 2 and 3], describe systems comprising at least one optical cable 300 of N optical fibres 70 connecting an optoelectronic box 100 to an optical head 200, or, if the spectral analysis device 20 and the polychromatic source 10 are not grouped together in the same optoelectronic box 100, of two optical cables 300 of N/2 optical fibres 71 and 72 connecting, respectively, the polychromatic source 10 to the measurement head 200 and the measurement head 200 to the spectral analysis device 20. The N/2 ends of the fibres 71 and 72 near the measurement head 200 form, respectively, a plurality of source points and a plurality of spatial filters that are optically conjugated. Likewise, the embodiments of a single-point chromatic confocal measurement device according to the prior art [Cf. Reference 1 and 4], also describe systems comprising at least one fibre 70 or a fibre coupler connecting an optoelectronic box 100 to an optical head 200. A Person Skilled in the Art considers the single-point chromatic confocal measurement device to be a specific case of the chromatic confocal measurement apparatus provided with a lateral field for which, a single point of the object 400 is measured (height or thickness) and for which, the number of fibres 70 used is reduced to N=2 or to a fibre coupler.

The embodiments, which use an optical cable 300 of N fibres 70, are very ingenious, since they allow the measurement head to be moved far from the computer and electronic means 30 for processing the signal, calculation, data transmission, control and configuring the measurement apparatus and from the power supply block 40. This allows the operator to configure the measurement apparatus and carry out measurements while being remote from the production line, for example. Moreover, this embodiment simplifies the integration of the measurement apparatus because the filtering holes are embodied by the end of each of the N fibres 70 contained in the optical cable 300, thus avoiding the difficulty of introducing N filtering holes into the device. However, of portion, their length, their more or less great capacity to resist mechanical stresses of friction, shearing, twisting or elongation, their loss of photometric transmission according to the radius of curvature imposed, the optical cables 300 are subject to wear when the measurement apparatus is subjected to numerous repetitive cycles comprising rapid accelerations and/or to rotary movements, which is exactly the case when these measurement apparatuses are used on production units for size control. Finally, the maintenance of the chromatic confocal measurement apparatus provided with a lateral field, if one or more fibres 70 belonging to the optical cable 300 break, quickly becomes complicated and requires the return of the measurement apparatus to the site of the manufacturer in order to change the entire optical cable (since changing a single fibre 70 is not possible for reasons of integration via gluing into grooves most often in the shape of a V). In order to prevent these breakdowns that are impossible to repair on site, the user may be forced to store one or more replacement apparatuses, in order to be able to carry out a standard replacement in case of a breakdown. This constraint has an impact that is often too great on the use and maintenance costs.

The optical cables 300 used in chromatic confocal measurement apparatuses provided with a field as implemented in the prior art, are thus a constraint for integrators and users that the invention described here allows to be totally or partly overcome.

The appended drawings illustrate the invention:

Figure 6:
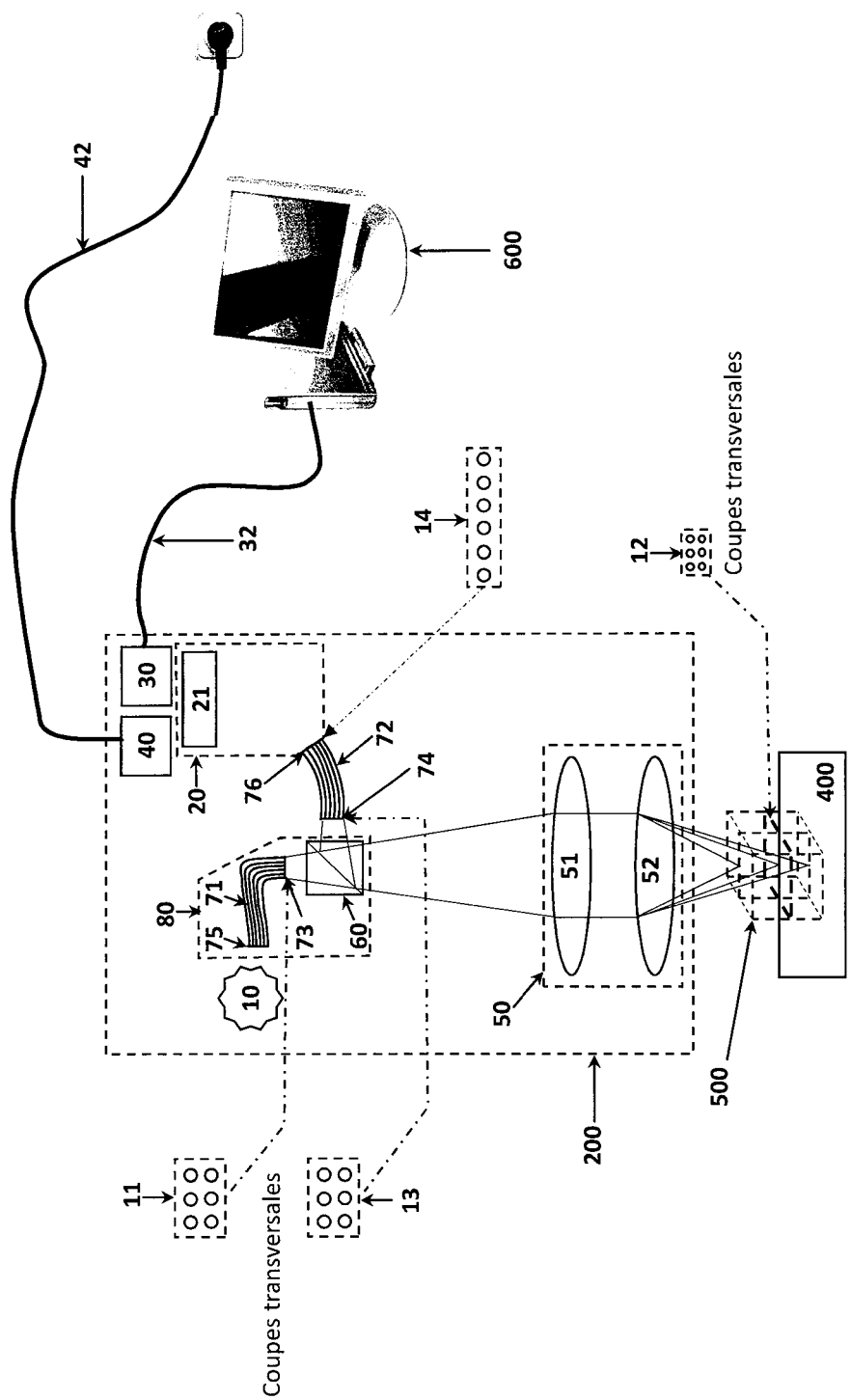

FIG. 6 illustrates, schematically, a third preferred embodiment of a chromatic confocal measurement apparatus provided with a lateral field according to the invention, for which the polychromatic source(s) and the spectral analysis device and computer and electronic means for processing the signal, calculation, data transmission, control and configuring the measurement apparatus are integrated into the measurement head.

Figure 7:
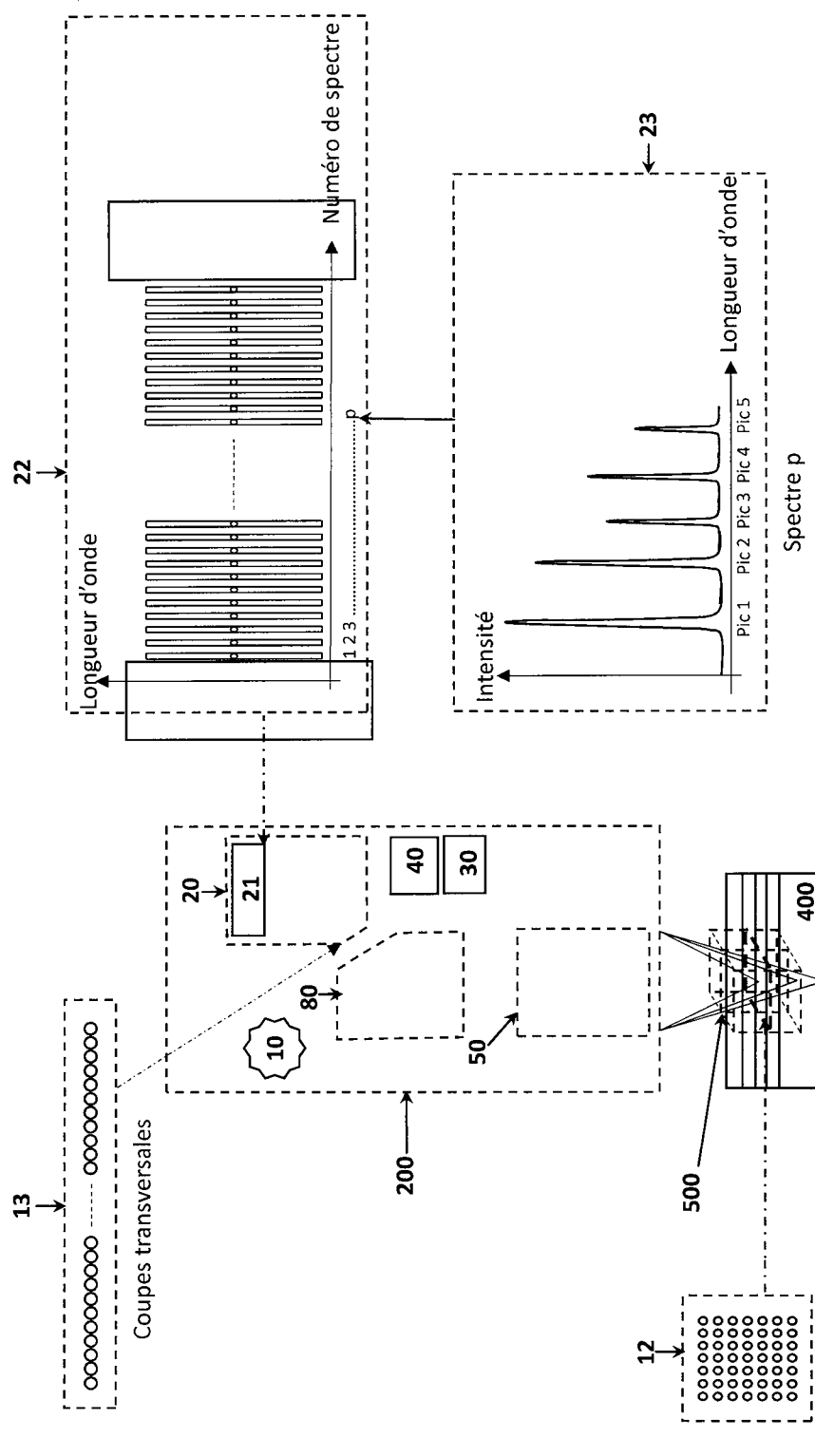

FIG. 7 illustrates, schematically, a chromatic confocal measurement apparatus provided with a lateral field according to the invention, which allows the simultaneous measurement of one or more heights and/or of one or more thicknesses of all the points of a field of the object that can potentially contain a plurality of layers.

The purpose of the invention is to eliminate the technical difficulties mentioned above. Thus, the invention, by eliminating all or a portion of the optical cables 300, promotes the robustness and compactness of the measurement apparatus. The purpose of the invention is to eliminate all or a portion of the optical cables 300 that are present in all the current chromatic confocal measurement apparatuses, whether single-point or provided with a lateral field.

The invention thus allows the constraints of integrating the measurement apparatus into an industrial environment, for example on a production line, to be overcome.

The invention also allows, the measurement device to be integrated into a motorised movement system, such as a Coordinate-Measuring Machine (CMM) that is most often in the form of a measurement gantry provided with translation axes and/or rotation axes, or also, of a robot arm with a plurality of axes of rotation. The absence of optical cables facilitates the integration and the use of the measurement apparatus according to the invention in this type of system.

Three embodiments allow all or a portion of the optical cables 300 to be eliminated in order to partly or totally overcome the constraints resulting from this architecture called "modular" because it consists of two totally separate element, an optoelectronic box 100 and an optical head 200, connected by an optical cable 300. These three embodiments are named as follows and will be described below:

1. Optical head 200 with an integrated polychromatic source 10,
2. Optical head 200 with a device for integrated spectral analysis 20,
3. Optical head 200 with a polychromatic source 10 and a device for integrated spectral analysis 20.

For these three embodiments, there are different versions that will be described below. These various embodiments will be illustrated and described as belonging to the family of the chromatic confocal apparatuses for measuring height and/or thickness provided with a lateral field, but the invention also relates to the single-point chromatic confocal apparatuses for measuring height and/or thickness that represents a specific case of the multipoint configuration (provided with a lateral field).

Figure 1:
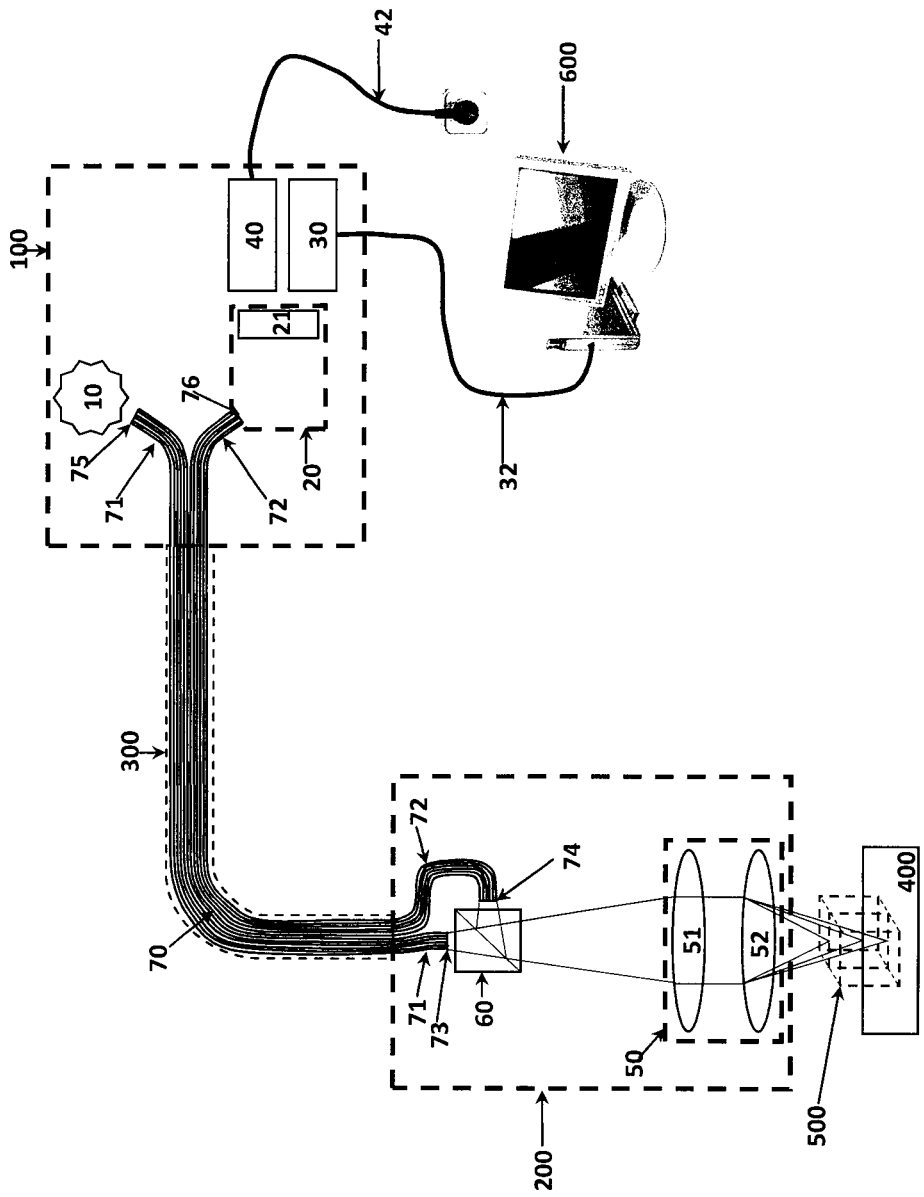
FIG. 1 illustrates an embodiment of a chromatic confocal measurement apparatus provided with a lateral field according to the prior art.
Figure 2:
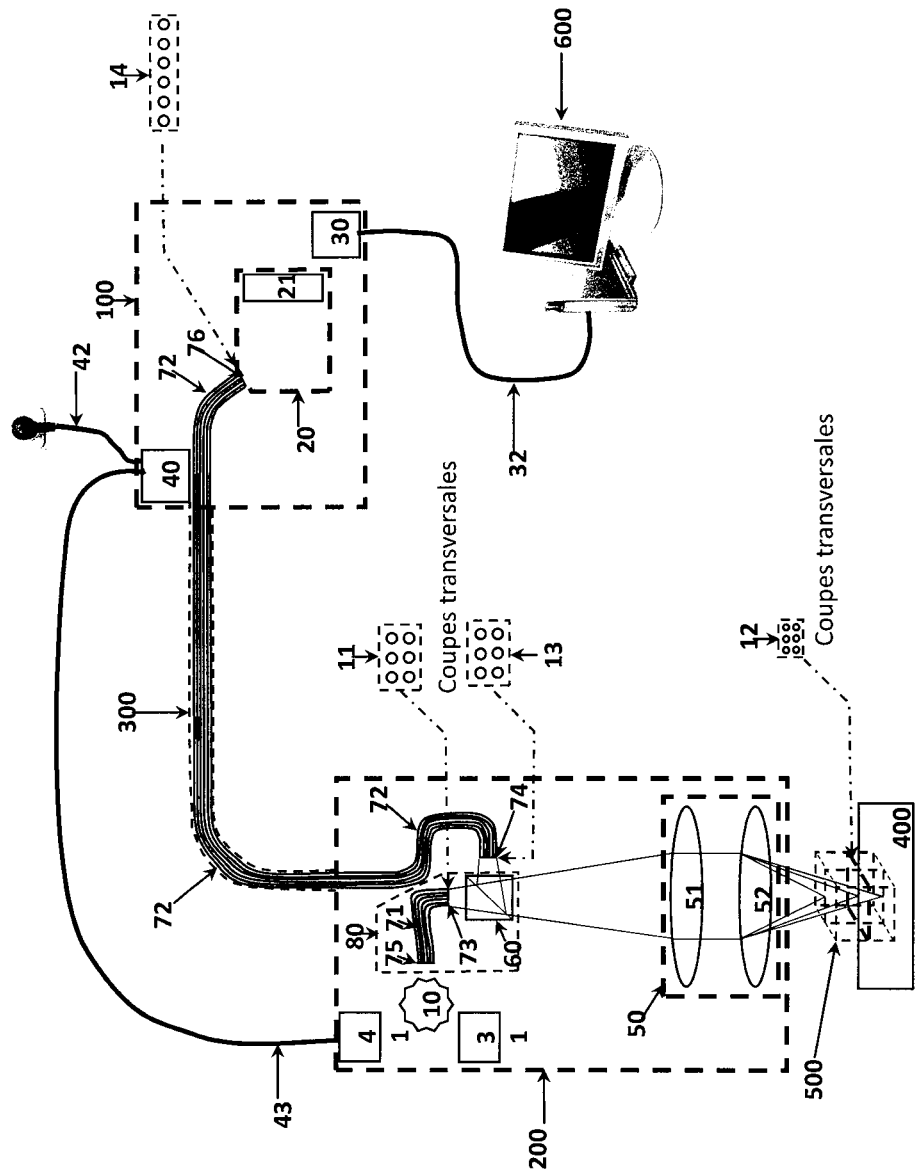
FIG. 2 illustrates a first preferred embodiment of a chromatic confocal measurement apparatus provided with a lateral field according to the invention, for which the polychromatic source is integrated into the measurement head.

FIG. 2 illustrates a first preferred embodiment of a chromatic confocal apparatus for measuring height and/or thickness provided with a lateral field according to the invention, for which a polychromatic source 10 is integrated into the measurement head 200, here called Optical head 200 with an integrated polychromatic source 10. Moreover, the measurement head 200, also contains electronic means 31 allowing the intensity and the emission frequency of the polychromatic source 10 to be controlled, optionally a power supply 41, a set of lenses 50, and a light guide subassembly 80. The function of the light guide subassembly 80 consisting, according to FIG. 2 and for example, of N/2 illumination fibres 71 and of a beam splitter parallelepiped 60 is to guide the light from the polychromatic source 10, injected into the N/2 ends 75 of the N/2 illumination fibres 71, to the set of lenses 50 and to structure the light according to an object lateral field 11 consisting of a plurality of source points embodied by the N/2 ends 73 of the N/2 illumination fibres 71. The set of lenses 50, which can consist of an achromatic collimator 51 and a chromatic lens 52 allows both the N/2 spots of light to be focused on the object 400 according to an image lateral field 12, but also the desired axial chromatic aberration that corresponds to the range of measurement of the chromatic confocal apparatus to be generated. The collimator 51 is thus totally devoid of an axial chromatic aberration, and its role is to collimate the beam coming from the light guide subassembly 80, and to manage the magnification of the set of optical lenses 50 and thus to manage the spot size on the surface of the object 400 positioned in the measurement volume 500 of the apparatus. The chromatic lens 52, which can be a set of lenses or a diffractive lens such as a Fresnel lens [Cf. Reference 1 and 4], allows the desired chromatic aberration to be obtained.

This first preferred embodiment only partly overcomes the constraints related to the chromatic confocal measurement apparatus provided with a lateral field according to the prior art, since an optical cable 300 of N/2 return fibres 72 (N being a positive even integer) is necessary in order to guide the backscattered light coming from the measurement head 200 to the optoelectronic box 100. The N/2 ends 74 of the N/2 return fibres 72 inside the measurement head 200, are positioned in the conjugated-image plane of the N/2 ends 73 of the N/2 illumination fibres 71 and are organised according to a conjugated image lateral field 13 strictly identical to the object lateral field 11 since the set of lenses 50 like any optical assembly used for a forward and return trajectory has unity magnification. The N/2 ends 74 act as filtering holes forming a plurality of spatial filters, giving this apparatus the property of being confocal.

In this first embodiment, the optoelectronic box 100 contains, a spectral analysis device 20, the last element of which is a photodetector 21, computer and electronic means 30 for processing the signal, calculation, data transmission, control and configuring the measurement apparatus, and a power supply block 40. The N/2 ends 76 of the N/2 return fibres 72 are connected at a spectral analysis device 20 input and are organised in such a way as to obtain a remote image lateral field 14 provided with a spatial sampling compatible with the spectral analysis of each of the points from the image lateral field 12. For example, FIG. 2 shows a remote image lateral field 14 that follows a line, but there are other organisations for this remote image lateral field 14, for example such as a non-regular grid (inter-fibre space in the horizontal direction different than that in the vertical direction), allowing the imaging of a plurality of spectra on the same line.

Finally, the optoelectronic box is connected to the power grid via a power supply cable 42, to a computer 600 with a data transmission cable 32, and to the measurement head 200 with an electric cable 43. However, a Person Skilled in the Art does not exclude a configuration for which the power supply block 40 and/or the power supply block 41 is a rechargeable battery and for which, no or respectively, only one power supply cable 42 or one power supply cable 43 is necessary during the phases of battery recharge. Likewise, in the near future, the possibility of transmitting the data in wireless mode can also be imagined, which would also allow the data transmission cables 32 to be eliminated.

Thus, this first preferred embodiment of a chromatic confocal measurement apparatus provided with a lateral field according to the invention allows the cable of N/2 illumination fibres 71 connecting the optoelectronic box 100 and the measurement head 200 to be advantageously replaced by a power supply cable 43. The substitution of the cable of N/2 illumination fibres 71 by a power supply cable 43 represents a development of interest for the integrators of a size-control system, who have moreover widely experienced the reliability, the robustness and the durability of electric cables and/or cables of data transmissions in industrial inspection systems installed on a production line.

The difference between this first preferred embodiment of a chromatic confocal measurement apparatus according to the invention and the measurement apparatuses according to the prior art lies in the integration of the polychromatic source 10 into the inside of the measurement head 200 and in the use of a suitable light guide subassembly 80. The integration of the polychromatic source(s) 10 into the inside of the measurement head 200, also involves the integration of the electronic means 31 allowing the intensity and the emission frequency of the polychromatic source 10 to be controlled and optionally also the integration of its power supply 41. Below, the FIGS. 3A, 3B, 3C and 3D that represent the various embodiments of a light guide 80 associated with the polychromatic source(s) 10 are described.

Figure 3A:
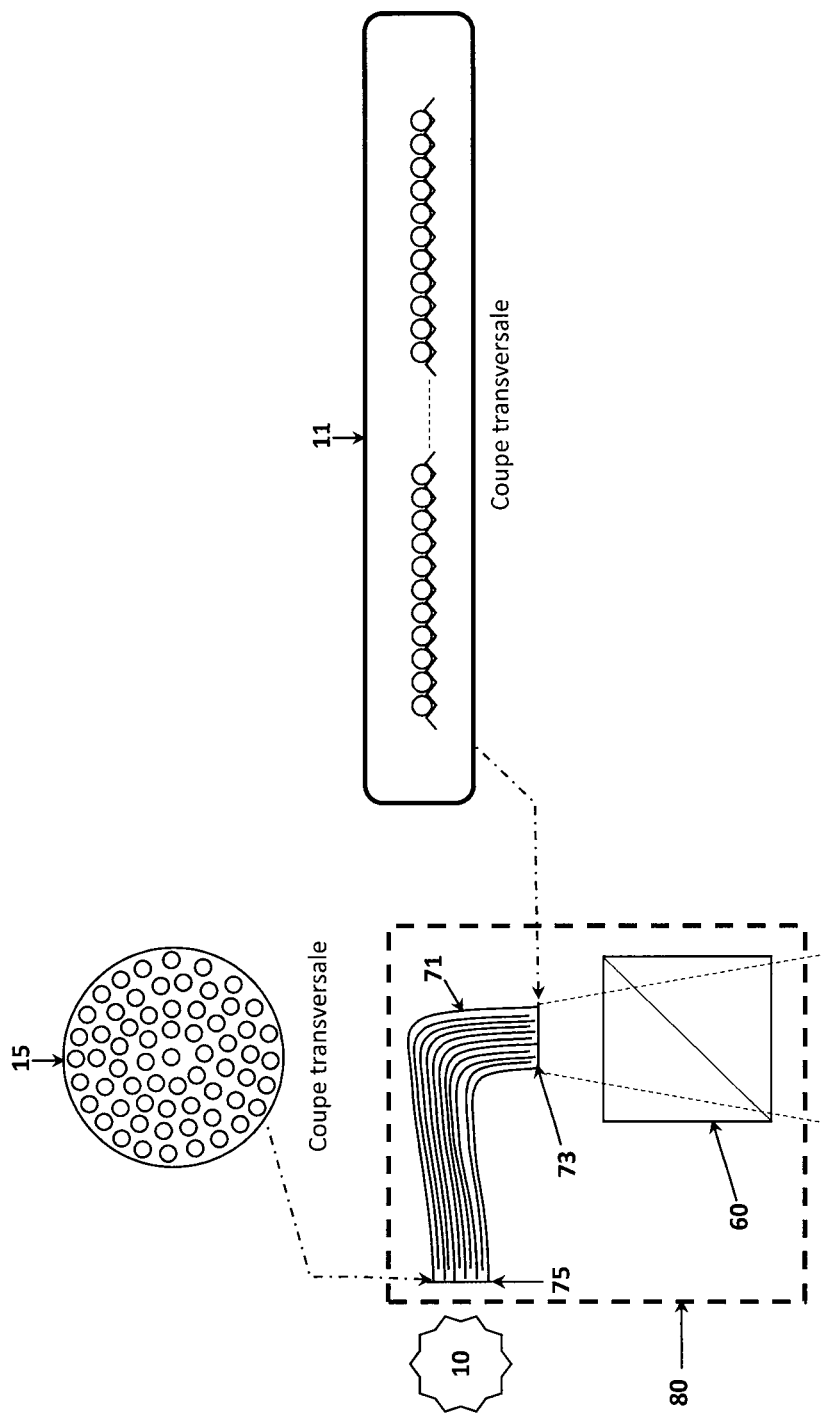
FIG. 3A illustrates, a first preferred embodiment of the polychromatic source subassembly associated with a light guide, in which the light guide contains N/2 illumination fibres.

FIG. 3A illustrates, a first preferred embodiment of the polychromatic source 10 subassembly associated with a light guide 80, in which the light guide 80 contains N/2 illumination fibres 71 and a beam splitter parallelepiped 60. These N/2 illumination fibres 71 are organised differently at their two ends 75 and 73 near the polychromatic source 10 and the device 60 for combination/separation of beams, respectively. The N/2 ends 75 near the polychromatic source 10, are grouped together and positioned facing the polychromatic source(s) 10 in order to collect as much luminous flux as possible. In order to do this, and for example, the N/2 ends 75 of the illumination fibres 71 can be grouped together into a circular cable. Obviously, other configurations are possible, for example, the N/2 ends 75 can be separated and grouped together into a plurality of different cables and positioned facing a plurality of polychromatic sources 10. Finally, for example, one or more lenses can also be positioned between the polychromatic source(s) 10 and the cable or cables containing the N/2 ends 75 of the illumination fibres 71, in order to improve the flux collection. The N/2 ends 73 of the illumination fibres 71 near the assembly 60 for combination/separation of the light are organised in such a way as to obtain the desired field and spatial sampling. This field can be a line, a rectangle, a disc, or any other geometric shape allowing the object 400 to be measured in an optimal manner. Thus, for example, in the case of a distribution of the N/2 ends 73 of illumination fibres 71 in a line with a constant inter-fibre space, as shown in FIG. 3A, a Person Skilled in the Art would favour the use of grooves in the shape of a V, allowing a very precise alignment of the N/2 ends 73 of the illumination fibres 71, as well as excellent regularity of the distance between the fibres.

Figure 3B:
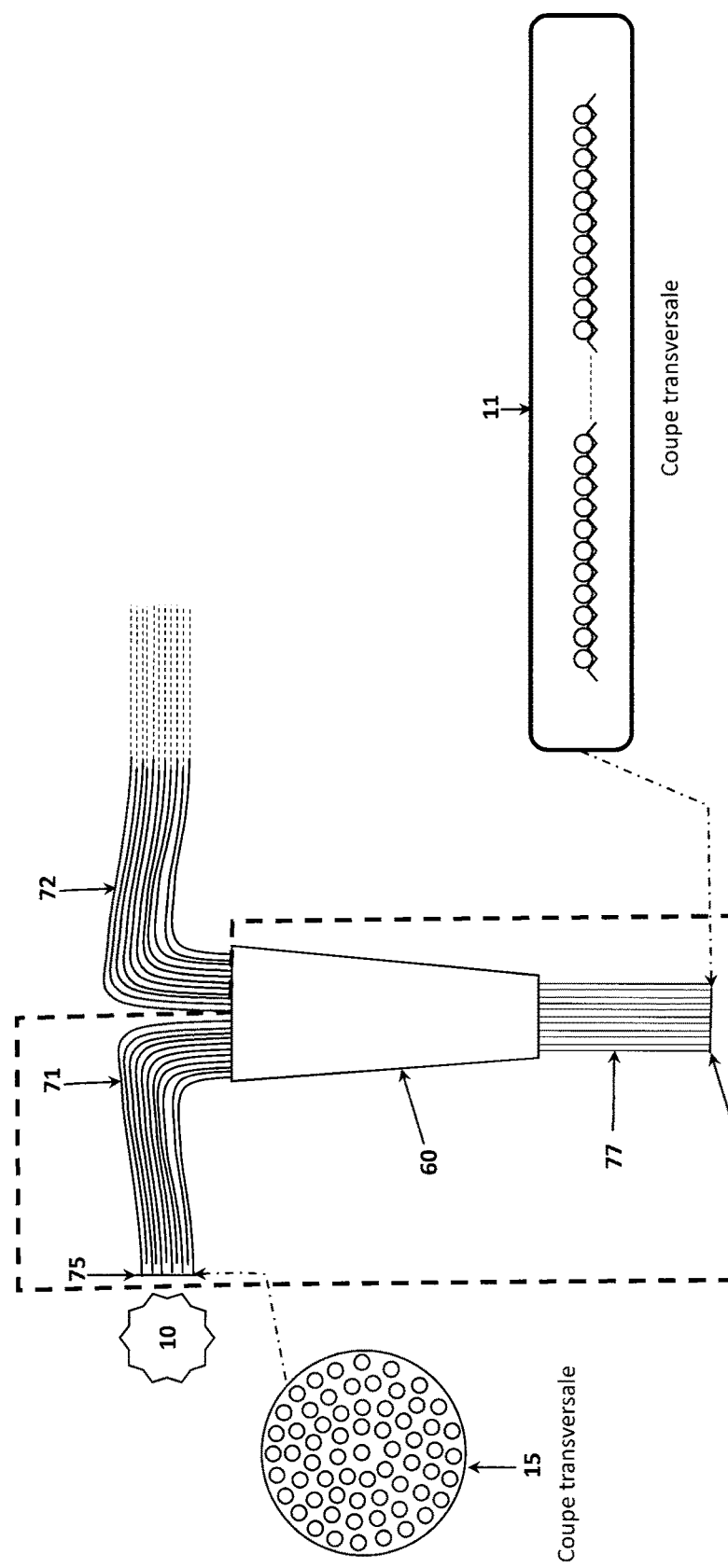
FIG. 3B illustrates, a second preferred embodiment of the polychromatic source subassembly associated with a light guide, in which the light guide is a portion of a set of N/2 fibre couplers.

FIG. 3B illustrates, a second preferred embodiment of the polychromatic source 10 subassembly associated with a light guide 80, in which the light guide 80 is a portion of a set of N/2 fibre couplers comprising, for each of them, N/2 illumination fibres 71, N/2 return fibres 72 and N/2 object fibres 77. The ends 75 of the N/2 illumination fibres 71 are near the polychromatic source 10. The N/2 ends 75 are grouped together and positioned facing the polychromatic source(s) 10 in order to collect as much luminous flux as possible, as described above, in the first preferred embodiment of the polychromatic source 10 subassembly associated with a light guide 80. The ends 73 of the N/2 object fibres 77 are near the set of lenses 50 not shown in FIG. 3B, and are organised in such a way as to obtain the desired field and spatial sampling, as described above, in the first preferred embodiment of the polychromatic source 10 subassembly associated with a light guide 80. For example, a transverse cross-section of the ends 73 of the object fibres 77 in a linear organisation is shown in FIG. 3B. Finally, the N/2 return fibres 72, which belong to the N/2 fibre couplers, do not belong to the light guide 80 subassembly. The assembly 60 for combination/separation of beams is in this case, the set of the N/2 zones of couplings of the N/2 fibre couplers. For reasons of ease of representation, FIG. 3B schematically illustrates the N/2 zones of couplings via a single block, yet is it obvious that this assembly 60 for combination/separation of beams consists of N/2 distinct zones of couplings.

This second preferred embodiment of the polychromatic source 10 subassembly associated with a light guide 80, does not provide a notable benefit with respect to the first embodiment illustrated by FIG. 3A. The fibre coupler allows, however, the elimination of the complicated phase of integration that consists of aligning the ends 74 of the return fibres 72 with the ends 73 of the illumination fibres 71, inevitable for the first preferred embodiment of the polychromatic source 10 subassembly associated with a light guide 80. On the other hand, the N/2 fibre couplers, used in this second preferred embodiment of the polychromatic source 10 associated with a light guide 80, forms a source of backscattered parasite light that is much more significant than that of the coupler of the beam splitter parallelepiped 60 type, thus limiting the turndown ratio of the photodetector 21.

Figure 3C:
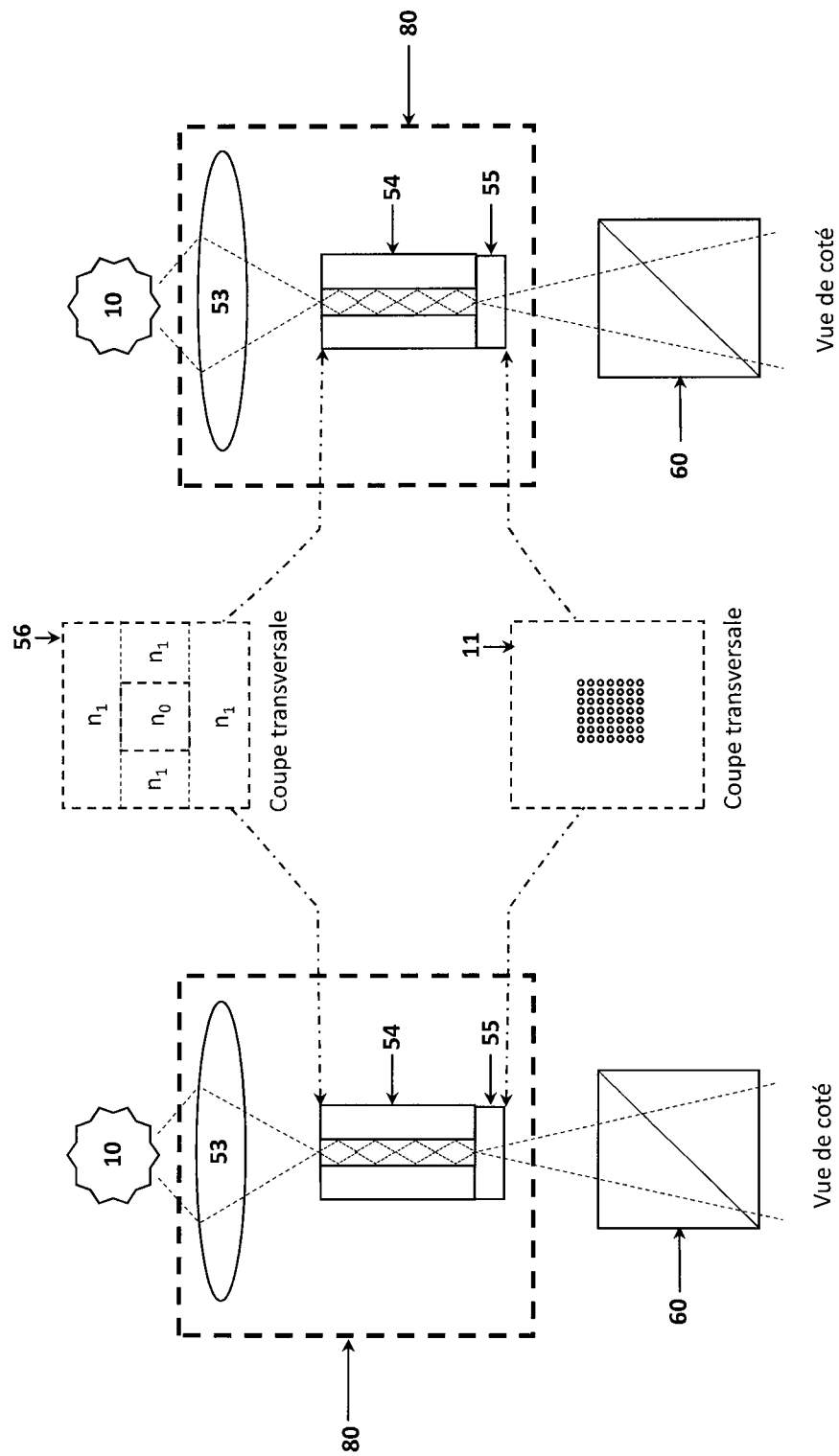
FIG. 3C illustrates, a third preferred embodiment of the polychromatic source subassembly associated with a light guide, in which the light guide consists of a lens for shaping the beam, of a homogeniser, of a mask having holes.

FIG. 3C illustrates, a third preferred embodiment of the polychromatic source 10 subassembly associated with a light guide 80, in which the light guide 80 consists of a lens for shaping the beam 53, of a homogeniser 54, of a mask 55 having holes. The lens for shaping the beam 53 can consist of one or more lenses and has the function of shaping the beam coming from the polychromatic source(s) 10 and injecting this beam at the input of the homogeniser 54, the role of which is to make the luminous flux uniform over the entire lateral field 11 in order for each measurement point to carry the same energy. This homogeniser 54 can be, for example, a waveguide having a square or circular cross-section, consisting of two lenses having different refractive indices no and $n_1$, as described in the transverse cross-section 56, in order to guide the light in the material having the index no (the material having the index $n_1$ can optionally be air). The mask of holes 55, a transverse cross-section 11 of which is shown, is generally positioned immediately after the homogeniser 54, and can ideally be glued to the latter. This mask 55 of holes allows the definition of the matrix of measurement points that will be imaged on the object 400 and thus the definition of the objet later field 11. The masks of holes 55 are created via evaporation/deposition of a metal, then the organisation of the holes is carried out via photolithography, the zones of the mask 55 covered with a metal layer have an optical transmittance of almost zero and only the zones devoid of a deposit transmit the light coming from the homogeniser 54. The mask of holes 55 allows the light to be structured according to an organisation that can have various shapes, such as a line, a disc, a rectangle or any other geometric shape allowing the object 400 to be measured in an optimal manner. The mask of holes 55 allows excellent repeatability of the patterns to be obtained, both in terms of shape and in terms of positioning of the patterns or holes in the matrix of patterns. The patterns or holes are for example circular, but can also be square or of any other geometric shape. This third preferred embodiment of the polychromatic source 10 subassembly associated with a light guide 80, thus uses a light guide 80 that has the advantage of eliminating the need to use illumination optical fibres 71, but a Person Skilled in the Art is aware of the loss of flux, and thus of the loss of photometric efficiency caused by this configuration.

A configuration similar to that described in FIG. 3C, would involve using a mask 55 consisting of a plurality of parallel solid lines, rather than a plurality of lines of holes, which would allow a gain in photometric efficiency, but this leads to a loss of confocality in one direction. This loss of confocality manifests itself as a loss of lateral resolution caused by the fact that each measurement point also receives the optical information of its close neighbours, this phenomenon also called cross-talk can highly deteriorate the measurement in terms of lateral resolution but also in terms of axial precision, especially for the measurement of objects that is photometrically non-uniform and/or comprises local discontinuities. Finally, it is also possible to not use a homogeniser 54, which would lead to a different photometric response according to the point observed on the object 400. This has the effect of highly limiting the turndown ratio, since, in this configuration, the points located in the middle of the field emit a more intense signal than the points located at the edge of the field.

Figure 3D:
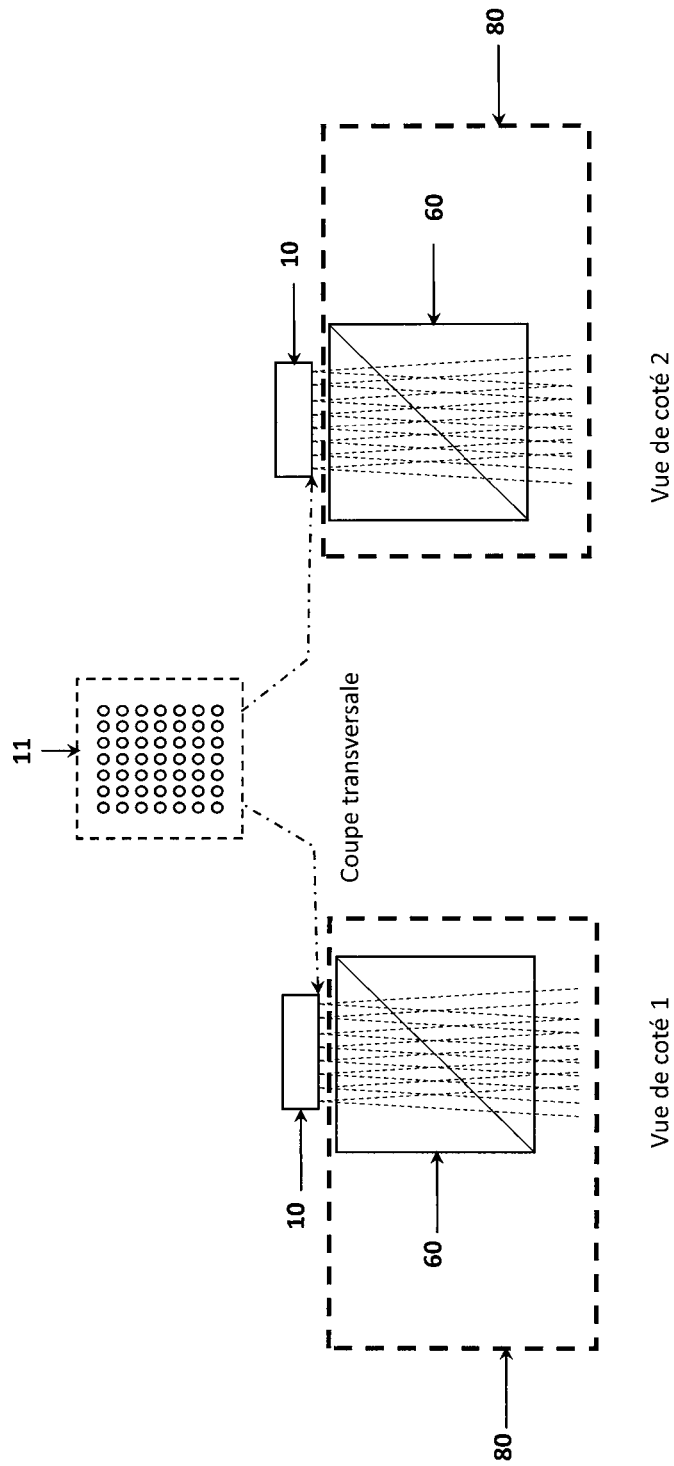
FIG. 3D illustrates, a fourth preferred embodiment of the polychromatic source subassembly associated with a light guide, but which differs from the previous ones in the following: the polychromatic sources are micro-LEDs positioned upstream of the assembly for combination/separation of beams.

FIG. 3D illustrates, a fourth preferred embodiment of the polychromatic source 10 subassembly associated with a light guide 80, but which differs from the previous ones in the following: the polychromatic sources 10 are micro-LEDs positioned upstream of the assembly 60 for combination/separation of beams, and the propagation occurs under free field conditions between the matrix of micro-LEDs 10 and the assembly 60 for combination/separation of beams. This fourth preferred embodiment considerably simplifies the overall architecture, since each micro-LED forms a single-point source point that is directly imaged by the set of lenses 50 on the object 400. This matrix of micro-LEDs has a dual function, it both forms the polychromatic sources 10 and also defines the object lateral field 11. This set of micro-LEDs, the luminous intensity per unit of surface area of which is indeed compatible with the chromatic confocal measurement apparatus according to the invention, is a rather recent technology from the microelectronics industry that thus enjoys production methods that allow emitting-surface sizes of up to 20 μm in diameter and a very precise and extremely repeatable structured organisation to be achieved. Moreover, it is also possible to individually address each of the micro-LEDs belonging to this matrix, thus providing the possibility of illuminating each of the LEDs successively or illuminating groups of LEDs successively, which also corresponds to one of the limitations of the prior art solved in a complex manner with matrix of micromirrors, by the reference patent application [3]. Thus, in the embodiment described by FIG. 3D, it is possible to define very precisely the measurement field that can represent a line, a rectangle, a disc, or any other geometric shape allowing the object 400 to be measured in an optimal manner. This fourth preferred embodiment allows the compactness of this subassembly to be increased, excellent control of the measurement field to be obtained (its shape, the periodicity of its patterns or holes), the need to use illumination optical fibres 71 to be eliminated, optimal photometric efficiency to be obtained due to the absence of a means for guiding or for transporting energy 80 between the polychromatic source(s) 10 and the assembly 60 for combination/separation of the light.

Figure 4A:
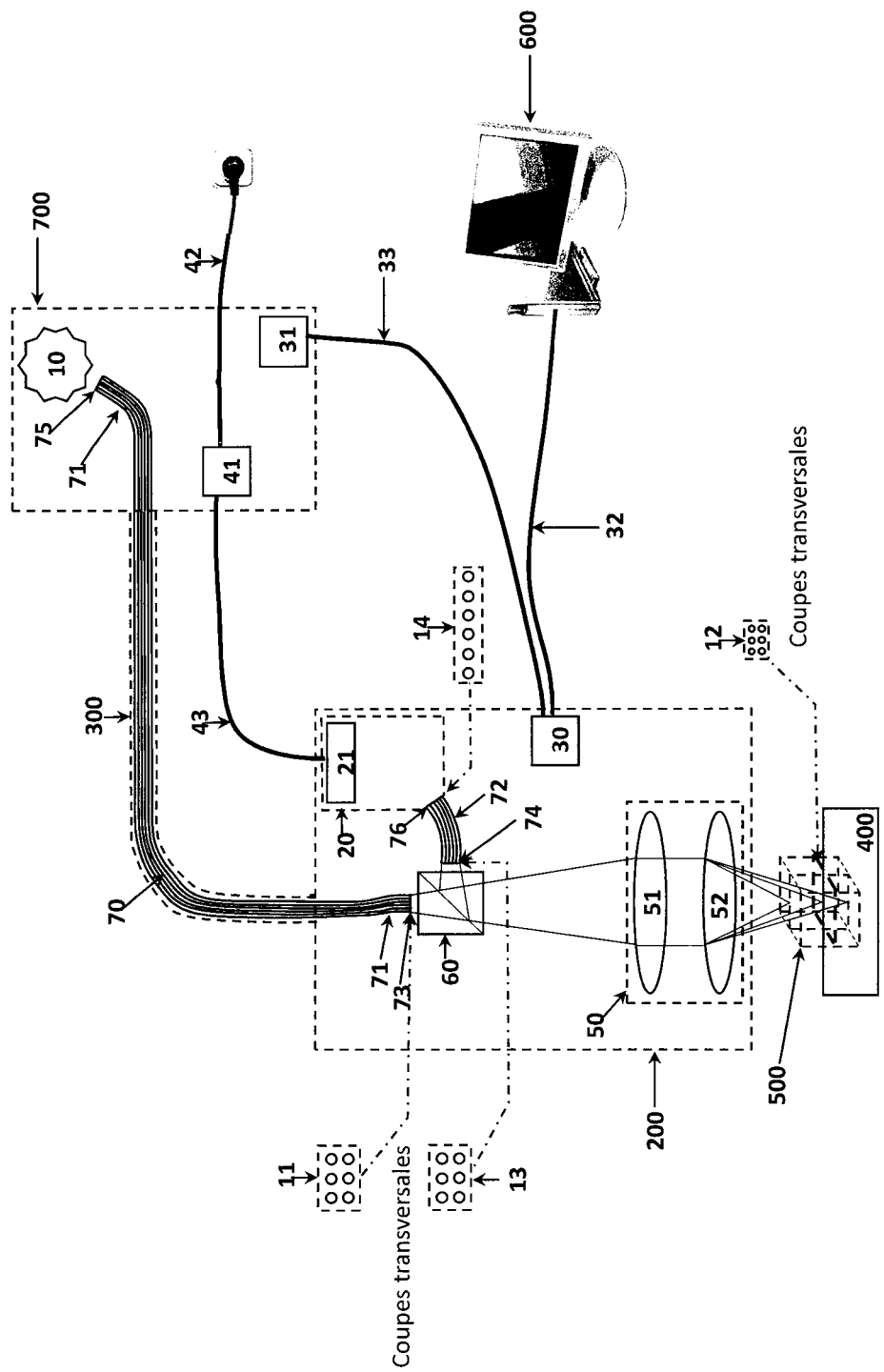
FIG. 4A illustrates, schematically, a second preferred embodiment of a chromatic confocal measurement apparatus provided with a lateral field according to the invention called Optical head 200 with an integrated spectral analysis device 20.

FIG. 4A illustrates, schematically, a second preferred embodiment of a chromatic confocal measurement apparatus provided with a lateral field according to the invention called Optical head 200 with an integrated spectral analysis device 20, for which the spectral analysis device 20, the last element of which is a photodetector 21, is integrated into the measurement head 200. For this second preferred embodiment of a chromatic confocal measurement apparatus provided with a lateral field according to the invention, the polychromatic source(s) 10 is (are) thus integrated into an independent source box 700 that also contains the electronic means 31 allowing the intensity and the emission frequency of the polychromatic source 10 to be controlled, optionally a power supply 41.

In addition to the spectral analysis device, the measurement head 200 contains a set of lenses 50, an assembly 60 for combination/separation and computer and electronic means 30 for processing the signal, calculation, data transmission, control and configuring the measurement apparatus. The set of lenses 50, which can consist, for example, of an achromatic collimator 51 and a chromatic lens 52, allows the N/2 spots of light coming from the N/2 ends 73 of the illumination fibres 71 to be focused on the object 400, and also allows the desired axial chromatic aberration that furthermore corresponds to the measurement range of the chromatic confocal apparatus to be generated. The collimator 51 is thus totally devoid of an axial chromatic aberration, and its role is to collimate the beam coming from the N/2 ends 73 of the illumination fibres 71, and to manage the magnification of the set of optical lenses 50 and thus manage the size of the spot on the surface of the object 400 positioned in the measurement volume 500 of the apparatus. The chromatic lens 52 is a set of lenses allowing the desired chromatic aberration to be obtained. This chromatic aberration can also be generated by using a diffractive lens such as a Fresnel lens [Cf. Reference 1 and 4]. The measurement head 200 also contains an assembly 60 for combination/separation, the role of which is to direct the beams coming from the object lateral field 11 defined by the N/2 ends 73 of the illumination fibres 71, towards the set of optical lenses 50 up to the object 400 according to an image lateral field 12, and to direct the beams backscattered by the object 400 and coming from the set of optical lenses 50 towards the spectral analysis device 20 that is integrated into the measurement head 200. The path of the beams backscattered from the object 400 to the input of the spectral analysis device 20 runs through a fibre link, consisting of N/2 return fibres 72, the N/2 ends 74 of which near the beam splitter parallelepiped 60 are conjugated with the N/2 ends 73 of the illumination fibres 71 and define the conjugated image lateral field 13 that must be strictly identical to the object lateral field 11 in order to not lose information during this optical coupling. The N/2 ends 74 act as filtering holes, forming a plurality of spatial filters, giving this apparatus the property of being confocal. At the input of the spectral analysis device 20, the N/2 ends 76 of the N/2 return fibres 71 are organised in such a way as to obtain a remote image lateral field 14 provided with spatial sampling compatible with the spectral analysis of each of the points from the image lateral field 12. For example, FIG. 4A shows a remote image lateral field 14 that follows a line, but there are other organisations for this remote image lateral field 14, for example such as a non-regular grid (inter-fibre space in the horizontal direction different than that in the vertical direction), allowing the imaging of a plurality of spectra on the same line. Finally, FIG. 4A shows an optical cable 300 consisting of N/2 illumination optical fibres 71, the N/2 ends 73 of which act as source points, in this case, the cable 300 allows the luminous flux to be transported and structured according to a lateral field 11. A new embodiment of the measurement apparatus corresponding to an optical head 200 with an integrated spectral analysis device 20 is described below and illustrated in FIG. 4B, for which the optical cable 300 is only used to transport the luminous flux.

This second preferred embodiment only partly overcomes the constraints related to the chromatic confocal measurement apparatus provided with a lateral field according to the prior art, since an optical cable 300 consisting of the N/2 illumination fibres (N being a positive even integer) is necessary in order to guide the light coming from the source box 700, and more particularly from the polychromatic source(s) 10, to the measurement head 200. The N/2 ends 75 of the N/2 illumination fibres 71 inside the source box 700 are positioned facing the polychromatic source(s) in order to collect as much luminous flux as possible.

Finally, the source box 700 is connected to the power grid via a power supply cable 42 and to the measurement head via a power supply cable 43 and a data transmission cable 33. As for the measurement head, it is connected to a computer 600 via a data transmission cable 32. However, a Person Skilled in the Art does not exclude a configuration for which the power supply block 40 and/or the power supply block 41 is a rechargeable battery and for which, no or respectively, only one power supply cable 42 or one power supply cable 43 is necessary during the phases of battery recharge. Likewise, in the near future, the possibility of transmitting the data in wireless mode (wireless) can also be imagined, allowing the transmission of significant data streams in real time without losses, which would also allow the need for the cables of data transmissions 32 and 33 to be eliminated. Thus, this second preferred embodiment of a chromatic confocal measurement apparatus provided with a lateral field according to the invention allows the cable of N/2 return fibres 72 connecting the optoelectronic box 100 and the measurement head 200 to be advantageously replaced by a power supply cable 43 and a data transmission cable 33. The substitution of the cable of N/2 return fibres 72 by a power supply cable 43 and a data transmission cable 33 represents a development of interest for the integrators of a size-control system, who have moreover widely experienced the reliability, the robustness and the durability of electric cables and/or cables of data transmissions in industrial inspection systems installed on a production line.

Figure 4B:
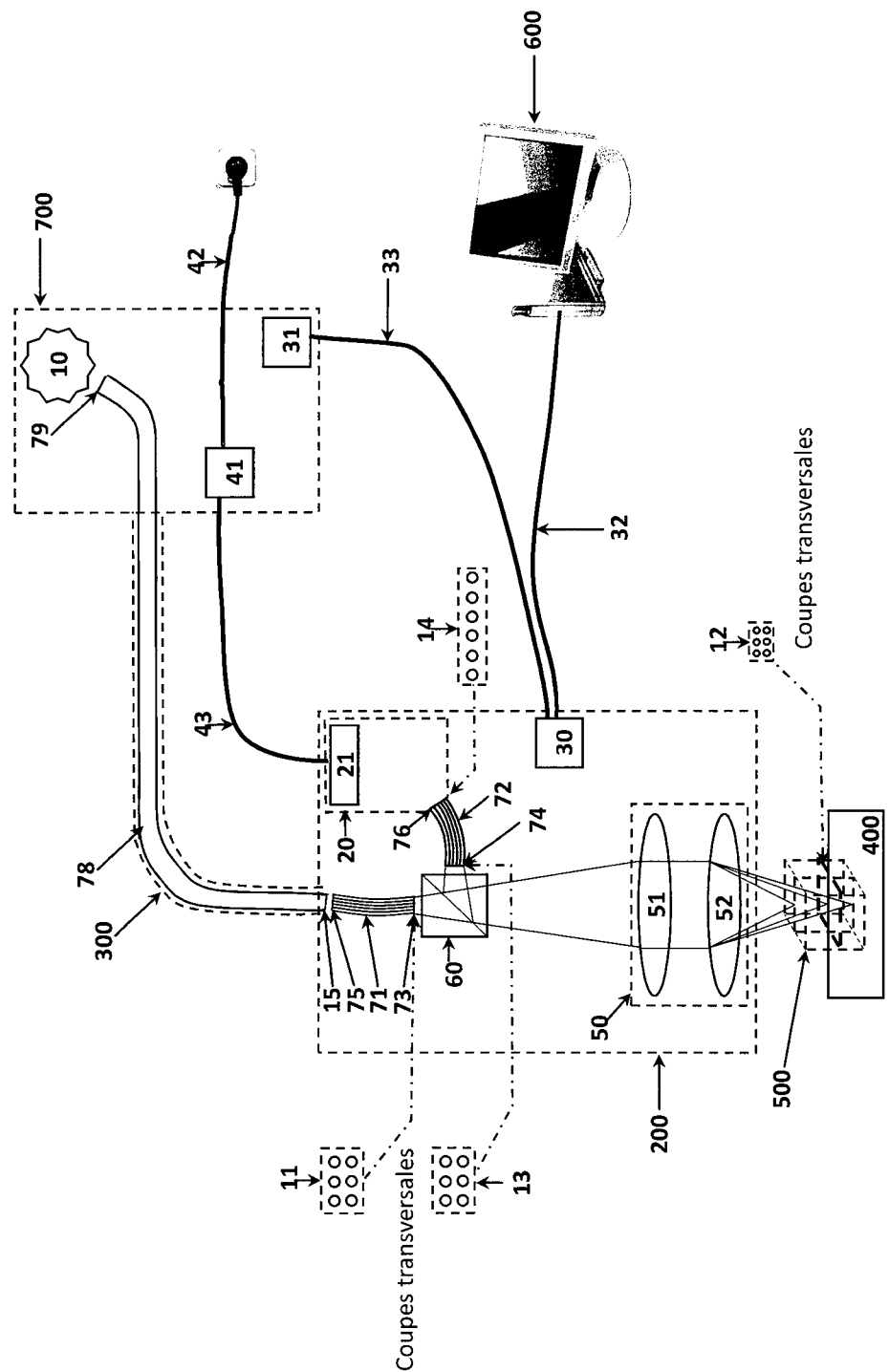
FIG. 4B illustrates, schematically, an alternative of the second preferred embodiment of a chromatic confocal measurement apparatus provided with a lateral field according to the invention called Optical head 200 with an integrated spectral analysis device 20.

FIG. 4B illustrates, schematically, an alternative of the second preferred embodiment of a chromatic confocal measurement apparatus provided with a lateral field according to the invention called Optical head 200 with an integrated spectral analysis device 20, which differs from the one previously described and illustrated in FIG. 4A, by the fact that, the optical cable 300 only contains one fibre or a plurality of fibres 78 (if the number of sources 10 is greater than one). In the case of a fibre 78 having a diameter that is suitable, as illustrated for example in FIG. 4B, its end 79 allows the flux coming from the polychromatic source 10 to be collected in an optimal manner, and its other end 15, acts as a secondary source inside the measurement head 200. In this case, the fibre 78 allows the source to be moved into the inside of the optical head 200, and each of the first three preferred embodiments of the polychromatic source 10 subassembly associated with a light guide 80, as illustrated in FIGS. 3A, 3B and 3C, allows the light to be structured according to an object lateral field 11.

This alternative of the second preferred embodiment of a chromatic confocal measurement apparatus provided with a lateral field according to the invention called Optical head 200 with an integrated spectral analysis device 20 allows fibres 78 having larger diameters to be used between the source 10 and the optical head 200, which provides greater robustness with respect to the chromatic confocal measurement apparatus provided with a lateral field according to the prior art.

For this second preferred embodiment of a chromatic confocal measurement apparatus provided with a lateral field according to the invention, for which the spectral analysis device 20 is integrated into the measurement head 200, FIGS. 4A and 4B illustrate a fibre link between the beam splitter parallelepiped 60 and the spectral analysis device 20, however, in the following paragraphs, other modes of propagation of the backscattered beam, in particular under free field conditions, will be described, using, respectively, the FIGS. 5A and 5B that represent two preferred embodiments of the measurement head 200, into which, the spectral analysis device 20 is integrated.

Figure 5A:
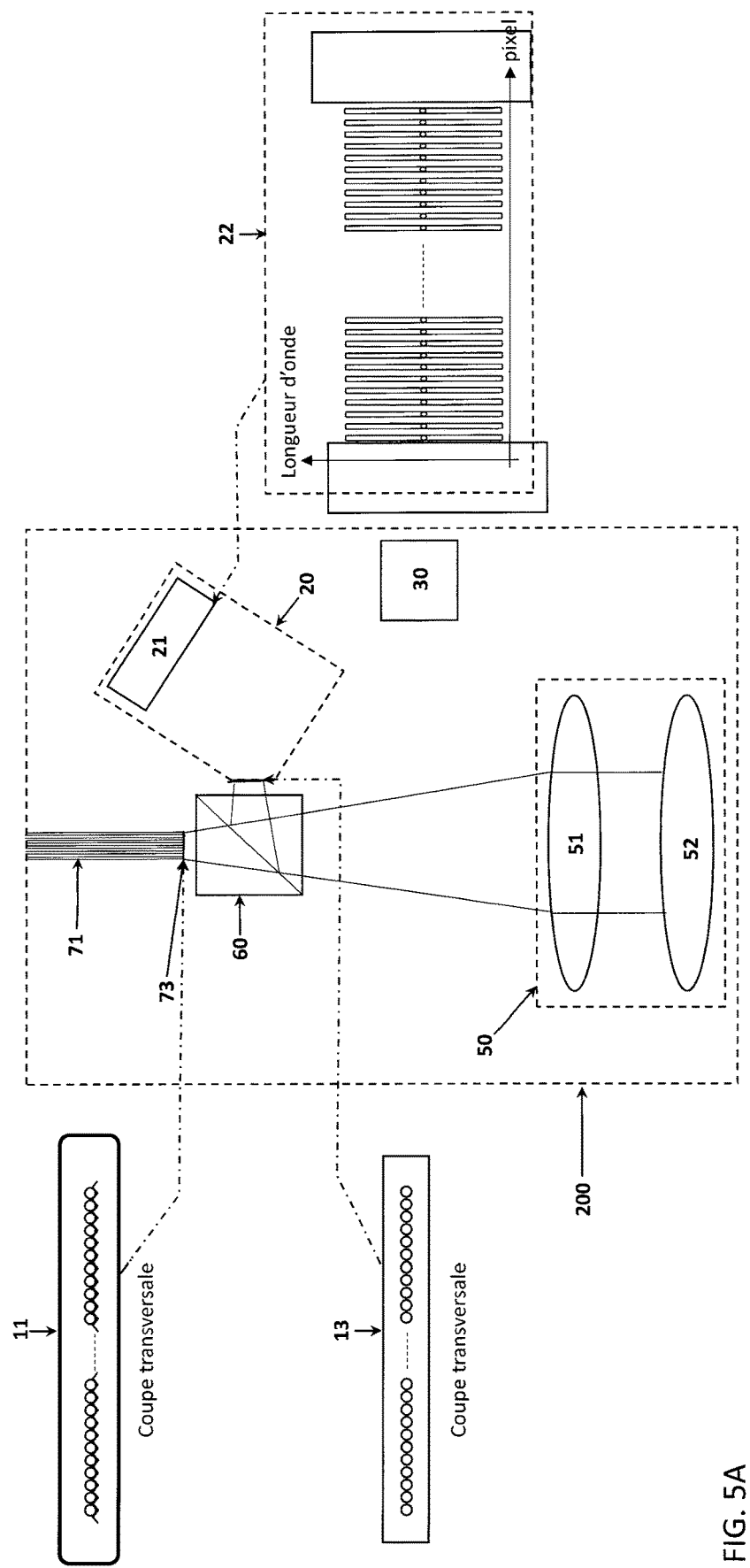
FIG. 5A illustrates a first preferred embodiment of the measurement head 200, into which, the spectral analysis device 20 is integrated.

FIG. 5A illustrates a first preferred embodiment of the measurement head 200, into which, the spectral analysis device 20 is integrated. For this first preferred embodiment, the N/2 ends 73 of the illumination fibres 71 form an object lateral field 11 according to an illumination line and the inter-fibre space is constant. In order to obtain this illumination line of N/2 points, a method of aligning the fibres in V-shaped grooves, for example, can be used. The image of the N/2 ends 73 of the illumination fibres 71 is formed, after a double forward and return journey through the set of lenses 50 and the beam splitter parallelepiped 60, in an image conjugated plane upstream of the spectral analysis device 20 and defines the image conjugated lateral field 13 in which a line of N/2 filtering holes is positioned that gives the measurement apparatus the property of confocality. The image conjugated lateral field 13 is thus perfectly identical to the object lateral field 11. The spectral analysis device 20, which can be, for example, a grating spectrometer, a prism spectrometer or a spectrometer incorporating a diffractive lens, has the function of dispersing each wavelength contained in the spectrum of the polychromatic source 10, and coming from each of the N/2 points of the illumination line, in a direction orthogonal to the line defined by the image conjugated lateral field 13. The spectral analysis device 20 must be calculated in order to accept a field having a size defined by the length of the N/2 ends 73 of the illumination fibres 71. In this first preferred embodiment of the measurement head 200 into which, the spectral analysis device 20 is integrated, the beam is propagated under free field conditions between the N/2 ends 73 of the illumination fibres 71 and the photodetector 21. For example, the organisation of the spectra 22 on the photodetector 21, resulting from the linear image conjugated lateral field 13 at the spectral analysis device 20 input, is also shown in FIG. 5A. The computer and electronic means 30 for processing the signal, calculation, data transmission, control and configuring the measurement apparatus allow, in particular, the signal delivered by the photodetector 21 to be processed and the processed data to be transmitted to a computer 600 via a data transmission cable 32.

Figure 5B:
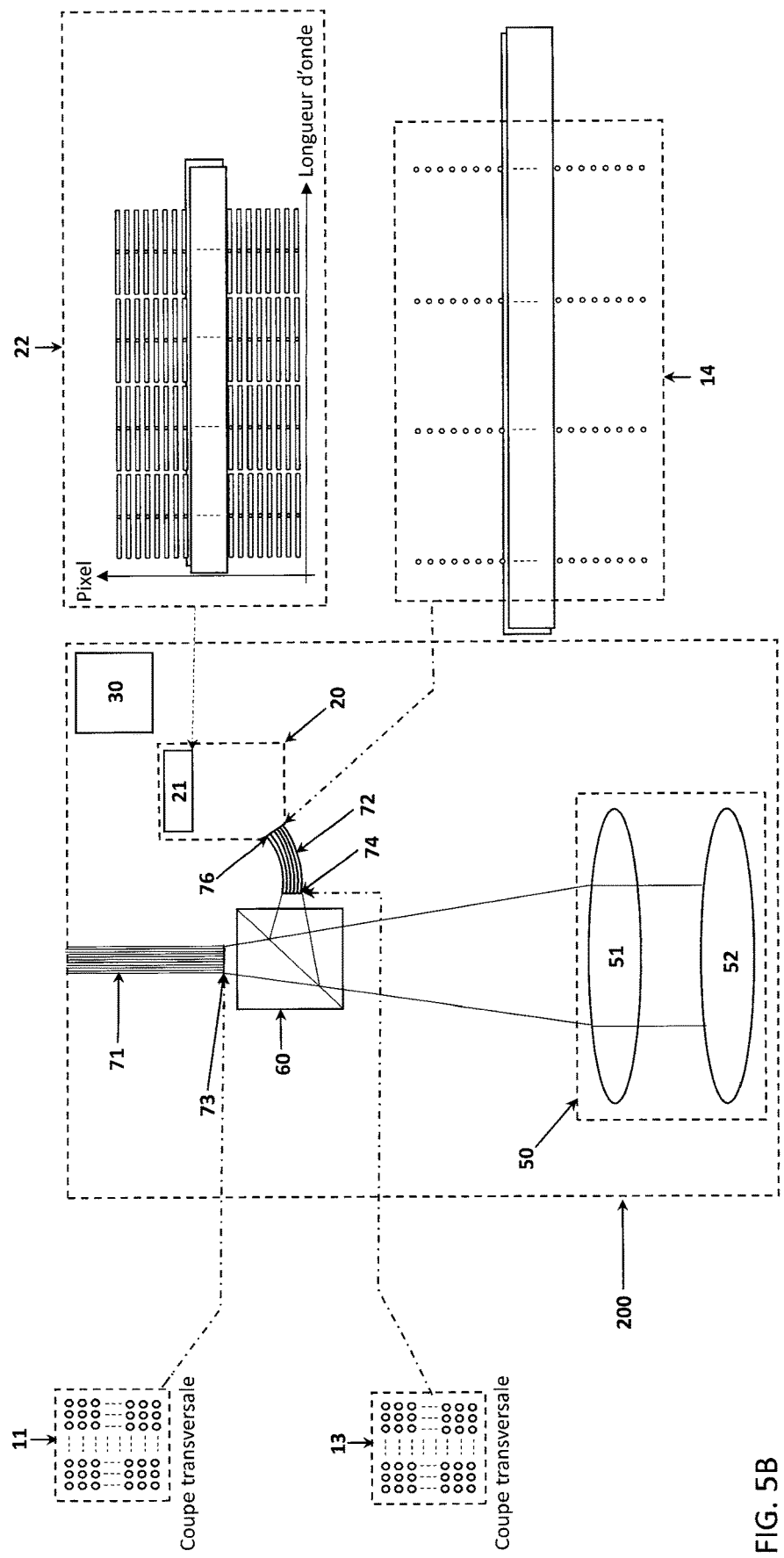
FIG. 5B illustrates a second preferred embodiment of the measurement head 200, into which, the spectral analysis device 20 is integrated.

FIG. 5B illustrates a second preferred embodiment of the measurement head 200, into which, the spectral analysis device 20 is integrated. For this second preferred embodiment, the N/2 ends 73 of the illumination fibres 71 form an object lateral field 11 according to a regular illumination grid in which the inter-fibre space is constant in both directions. For example, it is possible to obtain this regular illumination grid of N/2 points, by superimposing and gluing a plurality of V-shaped grooves. The image of the N/2 ends 73 of the illumination fibres 71 is formed, after a double forward and return journey through the set of lenses 50 and the beam splitter parallelepiped 60, in an image conjugated plane upstream of the spectral analysis device 20 and defines the image conjugated lateral field 13. The image conjugated lateral field 13 is thus perfectly identical to the object lateral field 11.

This second embodiment of the measurement head 200, into which, the spectral analysis device 20 is integrated, uses N/2 return fibres 72 positioned in such a way that their N/2 ends 74 near the beam splitter parallelepiped 60 are strictly organised according to the object lateral field 11, that is to say, in a regular grid. The N/2 ends 74 positioned in a regular grid act as filtering holes, forming a plurality of spatial filters, giving this device the property of confocality.

Near the spectral analysis device 20, the N/2 ends 76 of the return fibres 72 are organised according to a remote image field 14 in such a way as to optimise the performance of the chromatic confocal measurement apparatus provided with a lateral field according to the invention. For example, FIG. 5B describes an organisation, of the N/2 ends 76 of the return fibres 72, according to a non-regular grid (inter-fibre space in the horizontal direction different than that in the vertical direction), allowing the imaging of a plurality of spectra on the same line while guaranteeing that they do not overlap. The following paragraph will describe an embodiment of the measurement head 200, into which, the spectral analysis device 20 is integrated, incompatible with the measurement apparatus because spectra overlap. In this configuration, a spectral analysis device 20 having a prism or a spectral analysis device 20 that uses a diffractive lens is preferred in order to also avoid any overlapping of spectral orders caused by a diffraction grating. In this second preferred embodiment of the measurement head 200 into which, the spectral analysis device 20 is integrated, the use of N/2 return fibres 72 is necessary in order to optimally organise the remote image lateral field 14 at a spectral analysis device 20 input. For example, the organisation of the spectra 22 on the photodetector 21 resulting from a distribution of the N/2 ends 76 of the return fibres 72 in a non-regular grid is also shown in FIG. 5B.

The computer and electronic means 30 for processing the signal, calculation, data transmission, control and configuring the measurement apparatus allow, in particular, the signal delivered by the photodetector 21 to be processed and the processed data to be transmitted to a computer 600 via a data transmission cable 32.

Figure 5C:
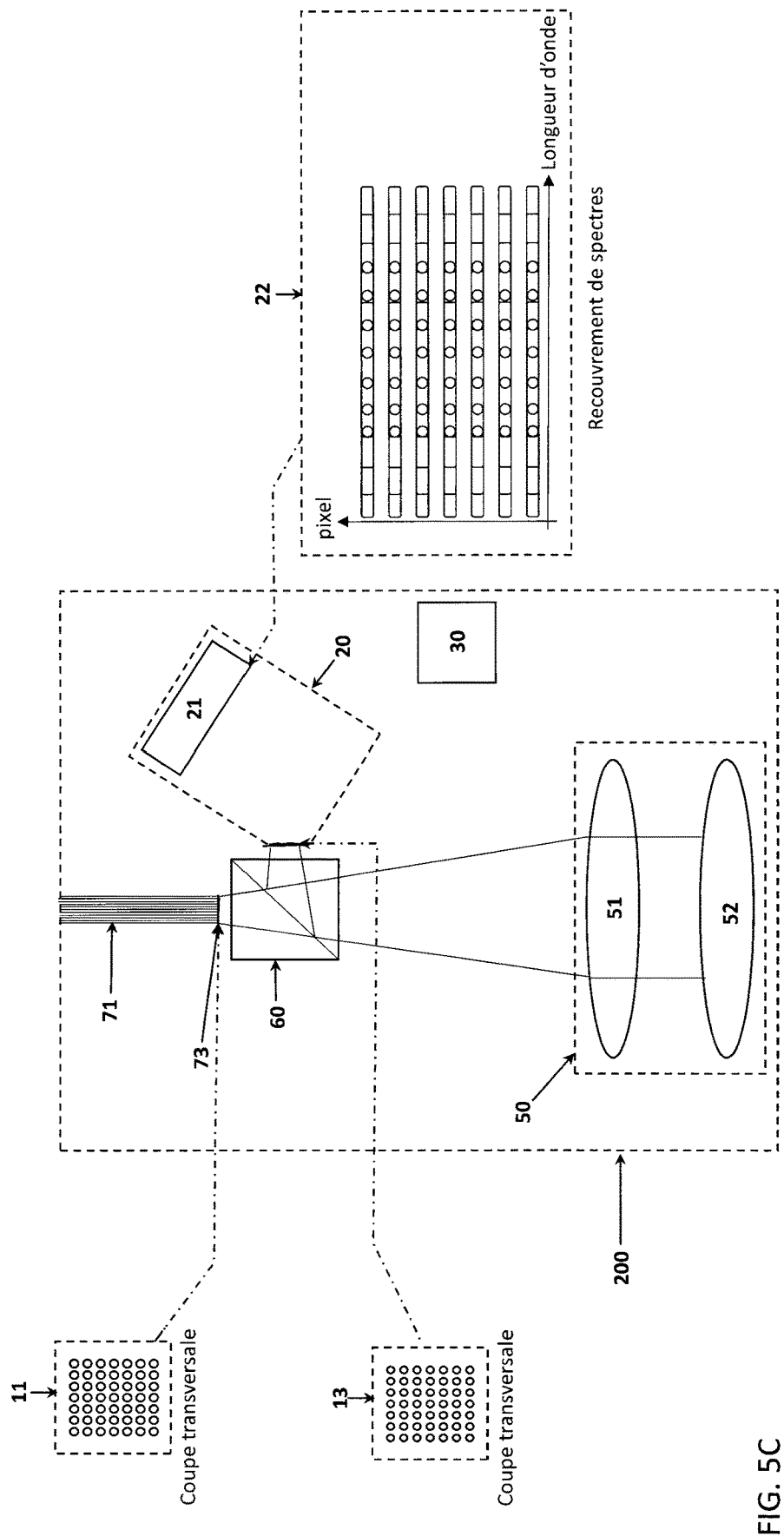
FIG. 5C illustrates a non-compliant embodiment of the measurement head 200, into which, the spectral analysis device 20 is integrated.

In order to understand in more detail the problems related to the organisation of the ends 76 of the return fibres 72 at a spectral analysis device 20 input, FIG. 5C illustrates a non-compliant embodiment of the measurement head 200, into which, the spectral analysis device 20 is integrated. This non-compliant embodiment repeats, for the illumination, the object lateral field 11 in the form of a regular grid like in the second preferred embodiment of the measurement head 200, illustrated by FIG. 5B, and for the return, a propagation of the beam under free field conditions, as described in the first preferred embodiment of the measurement head 200, and as illustrated by FIG. 5A.

This embodiment of the measurement head 200, into which, the spectral analysis device 20 is integrated, thus defined, is not suitable since the conjugated image lateral field 13 is a regular grid that cannot be imaged by a conventional spectral analysis device. Indeed, the image of an image-point matrix according to a regular grid through the spectral analysis device 20 leads to overlapping of spectra between neighbouring points. For example, the organisation of the spectra 22 on the photodetector 21 resulting from a distribution of the N/2 ends 76 of the return fibres 72 in a regular grid is shown in FIG. 5C, showing the problem of overlapping of spectra.

However, it is possible to design a spectral analysis device 20 that allows, after all, the spectra to be sufficiently separated in one direction in order to prevent any overlapping, but de facto, because of the regular grid, the points imaged in the other direction are also highly spaced apart, and require the use of a two-dimensional photodetector 21, the pixels of which are rectangular with a high aspect ratio, and/or the use of a two-dimensional photodetector 21 having a much greater number of pixels in one direction than in the other, or the analysis of only a small number of points. The various solutions proposed, although possible to produce, do not appear wise to a Person Skilled in the Art who does not, however, eliminate them.

Thus, when the propagation occurs under free field conditions, a Person Skilled in the Art easily understands that the organisation described by the N/2 ends 73 of the illumination fibres 71 can, after all, be of any type, but that an organisation other than linear, substantially complicates the design of the spectral analysis device 20. The performance of the system suffers as a result, in particular because of the large number of spectra shared by a line and thus to the small number of pixels used to image each spectrum. When an organisation described by the N/2 ends 73 of the illumination fibres 71 other than linear is preferred to describe the field in the space of the object 400, a Person Skilled in the Art, prefers the use of N/2 return fibres 72 (Cf. FIG. 5B) positioned between the combination/separation assembly 60, and the input of the spectral analysis device 20, in such a way that, the ends 74 of the N/2 return fibres are, near the combination/separation assembly 60, organised strictly in the same way as the N/2 ends 73 of the illumination fibres 71. Near the spectral analysis device 20, the N/2 ends 76 of the return fibres 72 are organised in such a way as to optimise the performance of the chromatic confocal measurement apparatus provided with a lateral field according to the invention. A linear organisation of the N/2 ends 76 of the return fibres 72 is most often preferred that involves having one spectrum per line, and thus a maximum resolution that leads to optimised precision of the chromatic confocal measurement apparatus provided with a lateral field according to the invention. A Person Skilled in the Art understands, however, that another organisation of the N/2 ends 76 of the return fibres 72, for example, that can be a non-regular rectangular matrix (inter-fibre space in the horizontal direction different than that in the vertical direction) can allow a plurality of spectra to be placed on the same line, and thus measurement to be carried out at a rate greater than for a linear organisation. For information, the measurement rate is dictated by the capacity of the photodetector 21 to read and transmit images rapidly. This rate depends on the number of lines read. Since the processing of the signal is sufficiently fast in order to not be a limiting factor, the greater the number of spectra shared by a line of the photodetector 21, the higher the measurement rate.

FIG. 6 illustrates a third preferred embodiment of a chromatic confocal measurement apparatus provided with a lateral field according to the invention called Optical head 200 with integrated polychromatic source 10 and spectral analysis device 20, for which the polychromatic source(s) 10, the spectral analysis device 20, computer and electronic means 30 for processing the signal, calculation, data transmission, control and configuring the measurement apparatus, and a power supply block 40 are integrated into the measurement head 200. For this third preferred embodiment of a chromatic confocal measurement apparatus provided with a lateral field according to the invention, the measurement head 200, also contains a light guide 80, a set of lenses 50. The light guide 80 contains, according to FIG. 6, a set of N/2 illumination fibres 71 and a combination/separation assembly 60. As previously described, the function of the N/2 illumination fibres 71 is to collect, from its N/2 ends 75, the light coming from the polychromatic source(s) 10, guide the light towards a combination/separation assembly 60, and structure the light according to an object lateral field 11 defined by its N/2 ends 73 near the combination/separation assembly 60. The function of the combination/separation assembly 60, which can, for example, be a beam splitter parallelepiped, is to direct the beams coming from the object lateral field 11 towards the set of optical lenses 50 up to the object 400, and to direct the beams backscattered by the object 400 through the set of optical lenses 50 towards the spectral analysis device 20.

The set of lenses 50, which can consist of a collimator 51 and a chromatic lens 52 allows both the N/2 spots of light to be focused on the object 400 according to an image lateral field 12, but also the desired axial chromatic aberration that partly defines the measurement volume 500 of the chromatic confocal apparatus to be generated. The beams backscattered by the object 400 are thus imaged through the set of lenses 50 in order to form a conjugated image lateral field 13 in the plane of the N/2 ends 74 of the return fibres 72. Thus, the measurement apparatus consists, inter alia, of a plurality of spatial filters located in the conjugated image plane 13 of a set of lenses 50 and organised strictly identically to the source points located in an object lateral field 11. These spatial filters can be embodied by the ends 74 of the return fibres 72 located between an assembly 60 for combination/separation of beams and a spectral analysis device 20, or by a matrix of holes when the propagation between an assembly 60 for combination/separation of beams and a spectral analysis device 20 occurs under free field conditions. This plurality of spatial filters conjugated with the source points gives the measurement apparatus the property of confocality. The conjugated image field 13 is repeated by the N/2 ends 74, then made remote and reorganised according to a remote image lateral field 14, formed by the ends 76 of the return fibres 72, at the input of the spectral analysis device 20. The remote image lateral field 14 is provided with spatial sampling compatible with the spectral analysis of each of the points from the image lateral field 12. FIG. 6 shows, for example, a remote image lateral field 14 organised in a line of points spaced apart regularly.

FIG. 6 shows a preferred embodiment of a chromatic confocal measurement apparatus provided with a lateral field according to the invention, but a Person Skilled in the Art is aware of the existence of other embodiments. All it takes to be sure of this is to combine one of the various preferred embodiments of the polychromatic source 10 subassembly associated with a light guide 80 illustrated in FIGS. 3A, 3B, 3C and 3D with one of the two preferred embodiments of the measurement head 200, into which, the spectral analysis device 20 is integrated, illustrated in FIGS. 5A and 5B. These various preferred embodiments of the polychromatic source 10 subassembly associated with a light guide 80, as well as the two preferred embodiments of the measurement head 200, into which, the spectral analysis device 20 is integrated, are obviously compatible with this third preferred embodiment of a chromatic confocal measurement apparatus provided with a lateral field according to the invention.

This third preferred embodiment totally overcomes the constraints related to the chromatic confocal measurement apparatus provided with a lateral field according to the prior art, since the optical cables 300 of N/2 illumination fibres 71 and N/2 return fibres 72 (N being a positive even integer) are abandoned and advantageously replaced by a power supply cable 42 and a data transmission cable 32 that can be, for example, a CameraLink or Giga-Ethernet cable. The electric cables and/or the cables of data transmissions that have moreover been widely tested in industrial inspection systems are robust, flexible, not sensitive to the stresses of acceleration or rotation related to the movement of the measurement head, and easily replaceable in case of deterioration. De facto, this third preferred embodiment of a chromatic confocal measurement apparatus provided with a lateral field according to the invention corresponds perfectly to the industrial needs of integration. Thus, this third preferred embodiment of a chromatic confocal measurement apparatus provided with a lateral field according to the invention, by eliminating the need for any optical cables, promotes the robustness and the compactness of the measurement apparatus.

This third preferred embodiment of a chromatic confocal measurement apparatus provided with a lateral field according to the invention, also allows, the measurement device to be integrated into a motorised movement system, such as a Coordinate-Measuring Machine (CMM) that is most often in the form of a measurement gantry provided with translation axes and/or rotation axes, or also, of a robot arm with a plurality of axes of rotation. The absence of optical cables facilitates the integration and the use of the measurement apparatus according to the invention in this type of system.

The device described allows the simultaneous measurement of one or more heights and/or of one or more thicknesses of all the points of a field of the object that can potentially contain a plurality of transparent layers, either in the visible range or in the Infrared range. FIG. 7 describes the signal obtained when an object 400, which has a plurality of layers, is positioned in the measurement volume 500 of a measurement head 200 like that described by the third preferred embodiment of a chromatic confocal measurement apparatus provided with a lateral field according to the invention. Thus, the measurement head contains one or more polychromatic sources 10, a light guide subassembly 80, a set of lenses 50, a spectral analysis device 20, and computer and electronic means 30 for processing the signal, calculation, data transmission, control and configuring the measurement apparatus, and a power supply block 40. The measurement head can, for example, illuminate an image lateral field 12 on the various surfaces of the object, and this field can then, for example, be reorganised in a line of equidistant points thus defining the remote image lateral field 14, at a spectral analysis device 20 input. The spectral image 22, collected on the photodetector 21, is thus a succession of N/2 spectra parallel to each other and equidistant. Finally, the image 23 represents a spectrum "p" out of the N/2 spectra imaged on the photodetector 21. This spectrum "p" contains 5 peaks, called "chromatic confocal peaks", corresponding to the 5 interfaces of the object 400. Thus, the detection of these 5 peaks and the calculation of their respective positions, allows the height of each interface to be calculated, but also the thickness of each layers of the object 400 if the refractive index of each of the layers is known. Consequently, if this detection and this calculation of position is applied for each of the N/2 spectra, it is possible to simultaneously calculate each height and each thickness of the object 400 for N/2 points of the image lateral field 12.

Finally, it is possible to produce this measurement apparatus independently, in the visible or Infra Red range, in such a way that the polychromatic source 10 emits, respectively, radiation in the visible or Infrared spectral band, that the set of optical lenses 50 is calculated in order to be provided with a controlled axial chromatic aberration in the visible or Infrared spectral band, respectively, and that finally the spectral analysis device 20 is also designed to analyse spectra in the visible or Infrared spectral band, respectively.

Thus, the chromatic confocal measurement apparatus provided with a lateral field according to the invention allows the simultaneous measurement of one or more heights and/or of one or more thicknesses of all the points of a field of the object that can potentially contain a plurality of transparent layers, either in the visible range or in the Infrared range.

This type of device is suitable for multiple industrial uses; from wafer measurement in the semiconductor field to the measurement and control of mechanical parts on the line, or even the measurement and control of the thickness of glass or plastic films. Other fields of uses exist, the common point is the desire for a measurement system that is faster and faster, more and more compact and as flexible as possible, and it is clear here that the chromatic confocal measurement apparatus provided with a lateral field according to the invention meets these various needs.

REFERENCES

[1] U.S. Pat. No. 4,585,349, C. Dahne, D. Gross, Method of and apparatus for determining the position of a device relative to a reference, Apr. 29, 1986.
[2] FR Patent 2950441A1, Y. Cohen Sabban, Capteur optique dote de champ lateral pour la numerisation 3D, Mar. 25, 2011.
[3] US Patent 20120019821A1, C. Yi-Wei, C. Liang-Chia, W. Yong-Lin, Linear chromatic confocal microscopic system, Jan. 26, 2012.
[4] EP Patent 2500685A1, H. Masayuki, H. Mariko, Confocal measurement device, Sep. 19, 2012.

KEY TO THE FIGURES

FIG. 2

| Coupes transversales | Transverse cross-sections |
| --- | --- |

FIG. 3A

| Coupe transversale | Transverse cross-section |
| --- | --- |

FIG. 3B

| Coupe transversale | Transverse cross-section |
| --- | --- |

FIG. 3C

| Coupe transversale | Transverse cross-section |
| Vue de coté | Side view |

FIG. 3D

| Coupe transversale | Transverse cross-section |
| Vue de coté | Side view |

FIG. 4A

| Coupes transversales | Transverse cross-sections |
| --- | --- |

FIG. 4B

| Coupes transversales | Transverse cross-sections |
| --- | --- |

FIG. 5A

| Coupe transversale | Transverse cross-section |
| Longueur d'onde | Wavelength |

FIG. 5B

| Coupe transversale | Transverse cross-section |
| Longueur d'onde | Wavelength |

FIG. 5C

| Coupe transversale | Transverse cross-section |
| Longueur d'onde | Wavelength |
| Recouvrement de spectres | Overlapping of spectra |

FIG. 6

| Coupes transversales | Transverse cross-sections |
| --- | --- |

FIG. 7

| Coupes transversales | Transverse cross-sections |
| Longueur d'onde | Wavelength |

| Numéro de spectre | Spectrum number |
| Intensité | Intensity |
| Spectre p | Spectrum p |
| Pic | Peak |

The invention claimed is:

1. A chromatic confocal measurement apparatus for measuring height, wherein the measurement apparatus is configured to measure simultaneously a plurality of distinct points of an object, and comprising a measurement volume which is defined, in a direction of an optical axis, by an axial chromatic aberration thereof, and in a plane normal to the optical axis, by an image lateral field consisting of a plurality of image points, and wherein the chromatic confocal measurement apparatus further comprises a measurement head forming a module wholly enclosing:
   at least one polychromatic source allowing a plurality of source points to be generated either directly under free field conditions or via propagation inside a set of illumination optical fibres;
   a combination/separation assembly configured to combine and/or separate beams;
   a set of lenses forming a chromatic optical system configured to accept an object lateral field defined by the plurality of source points, and comprising at least one lens having an extended axial chromatic aberration configured to spectrally split a light generated by the at least one polychromatic source into a continuous spectrum of wavelengths along the optical axis, and configured to form, in a space of the object, an image lateral field, an axial position of which depends on a wavelength of the continuous spectrum of wavelengths;

a spectrometer associated with a photodetector, and configured to image a plurality of spectra corresponding to a plurality of image points forming the image lateral field;

a plurality of spatial filters located in a conjugated image plane of a set of lenses and organised strictly identically to the plurality of source points located in the object lateral field, and wherein the plurality of spatial filters gives the measurement apparatus a property of confocality; and a computer configured for at least partially completing one or more of the following: processing the signal, calculation, data transmission, controlling and configuring the measurement apparatus, the processing including a signal acquisition, the calculation comprising determining a height value for each point of the plurality of distinct points.

2. The chromatic confocal measurement apparatus according to claim 1, wherein at least one polychromatic source is a matrix of micro-LEDs forming the plurality of source points organised according to the object lateral field.

3. The chromatic confocal measurement apparatus according to claim 1, wherein the matrix of micro-LEDs is addressed allowing a successive measurement, alone or in groups, of a plurality of distinct points of the object.

4. The chromatic confocal measurement apparatus according to claim 1, wherein a number of source points and of spatial filters located in the measurement head is one, allowing the measurement of a single point of the object, wherein the spatial filter is conjugated with the source point giving the measurement apparatus a property of confocality.

5. The chromatic confocal measurement apparatus according to claim 1, wherein the computer comprises one or more radio frequency transceivers allowing transfer of data, control and configuration of the chromatic confocal measurement apparatus via radio frequency waves.

6. The chromatic confocal measurement apparatus according to claim 1, comprising a rechargeable battery or a battery that is self-sufficient at least during a measurement.

7. The chromatic confocal measuring apparatus according to claim 1, wherein the plurality of source points and the plurality of spatial filters conjugated with the source points located in the measurement head form one or more continuous lines, allowing the chromatic confocal measurement apparatus to preserve a property of confocality in one direction and to simultaneously measure one or more continuous lines of an object.

8. A use of the chromatic confocal measurement apparatus according to claim 1 for measurement of a plurality of heights corresponding to the various surfaces of a multilayer object positioned in a measurement volume or for measurement of one or more thicknesses of an object comprising one or more layers positioned in a measurement volume.

9. The measurement apparatus according to claim 1 configured for measurement in the visible and/or infrared range.

10. A chromatic confocal measurement apparatus for measuring height configured for measuring simultaneously a plurality of distinct points of an object, and comprising a measurement volume which is defined, in the direction of an optical axis, by an axial chromatic aberration thereof, and in a plane normal to the optical axis, by an image lateral field consisting of a plurality of image points, wherein the chromatic confocal measurement apparatus further comprises:

a measurement head forming a module wholly enclosing:
at least one polychromatic source configured to generate a plurality of source points either directly under free field conditions or via propagation inside a set of illumination optical fibres;
a combination/separation assembly for combination and/or separation of beams;
a set of lenses forming a chromatic optical system configured to accept an object lateral field defined by the plurality of source points, and comprising at least one lens having an extended axial chromatic aberration configured to spectrally split a light generated by the at least one polychromatic source into a continuous spectrum of wavelengths along the optical axis, and configured to form, in a space of the object, an image lateral field, an axial position of which depends on a wavelength of the continuous spectrum of wavelengths;
a plurality of spatial filters located in a conjugated image plane of the set of lenses and organised strictly identically to the plurality of source points located in the object lateral field, wherein the plurality of spatial filters gives the chromatic confocal measurement apparatus a property of confocality;

an optoelectronic box enclosing:
a spectrometer device associated with a photodetector, and configured to image a plurality of spectra corresponding to the plurality of image points;
a computer configured for at least partially completing one or more of the followings: processing the signal, calculation, data transmission, controlling and configuring the chromatic confocal measurement apparatus, the processing including a signal acquisition, and an optical cable connecting the measurement head and the optoelectronic box, the optical cable comprising a plurality of optical fibres.

11. A chromatic confocal measurement apparatus for measuring height wherein the measurement apparatus is configured to measure a plurality of distinct points of an object simultaneously, and comprising a measurement volume which is defined, in a direction of an optical axis, by an axial chromatic aberration, and in a plane normal to the optical axis, by a image lateral field consisting of a plurality of image points, and wherein the chromatic confocal measurement apparatus comprises:

a source box comprising:
at least one polychromatic source allowing the plurality of source points to be generated either directly under free field conditions or via propagation inside a set of illumination optical fibres,
an electronic device allowing an intensity and an emission frequency of the at least one polychromatic source to be controlled,
a power supply, a measurement head forming a module wholly enclosing:
an assembly for combination and/or separation of beams;
a set of lenses forming a chromatic optical system configured to accept an object lateral field defined by the plurality of source points, and comprising at least one lens having an extended axial chromatic aberration configured to spectrally split a light generated by the at least one polychromatic source into a continuous spectrum of wavelengths along the optical axis, and configured to form, in a space of the object, an image lateral field, an axial position of which depends on a wavelength of the continuous spectrum of wavelengths;

a spectrometer device associated with a photodetector, configured to image a plurality of spectra corresponding to the plurality of image points forming the image lateral field;

a plurality of spatial filters located in a conjugated image plane of a set of lenses and organised strictly identically to the plurality of source points located in the object lateral field, wherein this plurality of spatial filters conjugated with the plurality of source points gives the chromatic confocal measurement apparatus a property of confocality; and a computer configured for at least partially completing one or more of the followings: processing the signal, calculation, data transmission, controlling and configuring the chromatic confocal measurement apparatus, the processing including a signal acquisition, and an optical cable connecting the chromatic confocal measurement head and the source box, the optical cable comprising a plurality of optical fibres.

12. The chromatic confocal apparatus measurement for measuring height according to claim 11, wherein the optical cable comprises one or more optical fibres having a diameter configured for connecting the measurement head and the source box, and wherein at least one end of the optical cable is located inside the measurement head and acts as a secondary source.

13. A chromatic confocal measurement apparatus for measuring height, wherein the measurement apparatus is configured to measure simultaneously a plurality of distinct points of an object, and comprising a measurement volume which is defined, in a direction of an optical axis, by an axial chromatic aberration thereof, and in a plane normal to the optical axis, by an image lateral field consisting of a plurality of image points, and wherein the chromatic confocal measurement apparatus further comprises a measurement head forming a module wholly enclosing:

at least one polychromatic source allowing a plurality of source points to be generated directly under free field conditions;

a combination/separation assembly configured to combine and/or separate beams;

a set of lenses forming a chromatic optical system configured to accept an object lateral field defined by the plurality of source points, and comprising at least one lens having an extended axial chromatic aberration configured to split a light generated by the at least one polychromatic source into a continuous spectrum of wavelengths along the optical axis, and configured to form, in a space of the object, an image lateral field, an axial position of which depends on a wavelength of the continuous spectrum of wavelengths;

a spectrometer associated with a photodetector, and configured to image a plurality of spectra corresponding to a plurality of image points forming the image lateral field;

a plurality of spatial filters located in a conjugated image plane of a set of lenses and organised strictly identically to the plurality of source points located in the object lateral field, and wherein the plurality of spatial filters gives the measurement apparatus a property of confocality, a computer configured for at least partially completing one or more of the following: processing the signal, calculation, data transmission, controlling and configuring the measurement apparatus, the processing including a signal acquisition, the calculation comprising determining a height value for each point of the plurality of distinct points, and, wherein at least one polychromatic source is a matrix of micro-LEDs forming the plurality of source points organised according to the object lateral field.

* * * * *